United States Patent
Sorbara et al.

(10) Patent No.: US 8,238,895 B2
(45) Date of Patent: Aug. 7, 2012

(54) METHOD AND SYSTEM FOR DISTRIBUTING MULTIMEDIA CONTENTS THROUGH A WIRELESS COMMUNICATIONS NETWORK, PARTICULARLY A MOBILE TELEPHONY NETWORK

(75) Inventors: Davide Sorbara, Turin (IT); Enrico Zucca, Turin (IT); Mario Madella, Turin (IT); Giuseppe Catalano, Turin (IT)

(73) Assignee: Telecom Italia S.p.A., Milan (IT)

( * ) Notice: Subject to any disclaimer, the term of this patent is extended or adjusted under 35 U.S.C. 154(b) by 1005 days.

(21) Appl. No.: 11/547,235

(22) PCT Filed: Apr. 14, 2004

(86) PCT No.: PCT/EP2004/050517
§ 371 (c)(1),
(2), (4) Date: Oct. 3, 2006

(87) PCT Pub. No.: WO2005/101752
PCT Pub. Date: Oct. 27, 2005

(65) Prior Publication Data
US 2007/0265012 A1    Nov. 15, 2007

(51) Int. Cl.
H04W 4/00 (2009.01)
(52) U.S. Cl. ............ 455/422.1; 455/445; 455/428; 370/352
(58) Field of Classification Search ............. 370/299.7, 370/395.3, 432, 510, 912; 455/503, 3.01
See application file for complete search history.

(56) References Cited

U.S. PATENT DOCUMENTS
6,445,922 B1 * 9/2002 Hiller et al. ............... 455/433
(Continued)

FOREIGN PATENT DOCUMENTS
EP    1 363 467 A2    11/2003
(Continued)

OTHER PUBLICATIONS

"Digital Cellular Telecommunications System (Phase 2+); Overall Description of the GPRS Radio Interface; Stage 2 (3GPP TS 43.064 version 5.1.1 Release 5)," ETSI TS 143 064, Version 5.1.1, pp. 1-59, (May 2003).

(Continued)

Primary Examiner — Kamran Afshar
Assistant Examiner — Joseph Dean, Jr.
(74) Attorney, Agent, or Firm — Finnegan, Henderson, Farabow, Garrett & Dunner, L.L.P.

(57) ABSTRACT

In a wireless communications network having a base station subsystem controlling at least one network cell, and in which the base station subsystem communicates with mobile stations in the cell through radio blocks, a method of distributing information contents received in data packets at the base station subsystem to the mobile stations, includes obtaining, starting from the data packets, radio blocks to be transmitted through the network cell, labeling the radio blocks with a first radio link identifier, identifying a logic connection between a mobile station and the base station subsystem, communicating the first radio link identifier to a first mobile station in the network cell, and in case at least one second mobile station in the network cell, asks to receive the information contents, communicating thereto the first radio link identifier. The method further includes having the first mobile station and the at least one second mobile station assigned respective second radio link identifiers to be included in the radio blocks.

36 Claims, 10 Drawing Sheets

U.S. PATENT DOCUMENTS

| | | | |
|---|---|---|---|
| 6,671,511 B1 * | 12/2003 | Forssell et al. | 455/452.1 |
| 2001/0014917 A1 * | 8/2001 | Ishiyama et al. | 709/227 |
| 2002/0065081 A1 * | 5/2002 | Barany et al. | 455/450 |
| 2002/0141391 A1 * | 10/2002 | Hsu | 370/352 |
| 2003/0043786 A1 * | 3/2003 | Kall et al. | 370/352 |
| 2004/0185837 A1 * | 9/2004 | Kim et al. | 455/414.3 |

FOREIGN PATENT DOCUMENTS

| | | |
|---|---|---|
| EP | 1 387 591 A1 | 2/2004 |
| WO | WO 03/019840 A2 | 3/2003 |
| WO | WO 2004/001955 A1 | 3/2004 |

OTHER PUBLICATIONS $3^{rd}$ Generation Partnership Project; Technical Specification Group Services and System Aspects; Multimedia Broadcast/Multicast Service (MBMS); Architecture and Functional Description (Release 6), 3GPP TS 23.246, Version 6.2.0, pp. 1-40, (Mar. 2004).

Siemens, "Common Feedback Channel for MBMS Delivery," 3GPP TSG GERAN 2 #18bis, G2-040286, Agenda item: 5.4.2, pp. 1-5, (Mar. 22-26, 2004).

\* cited by examiner

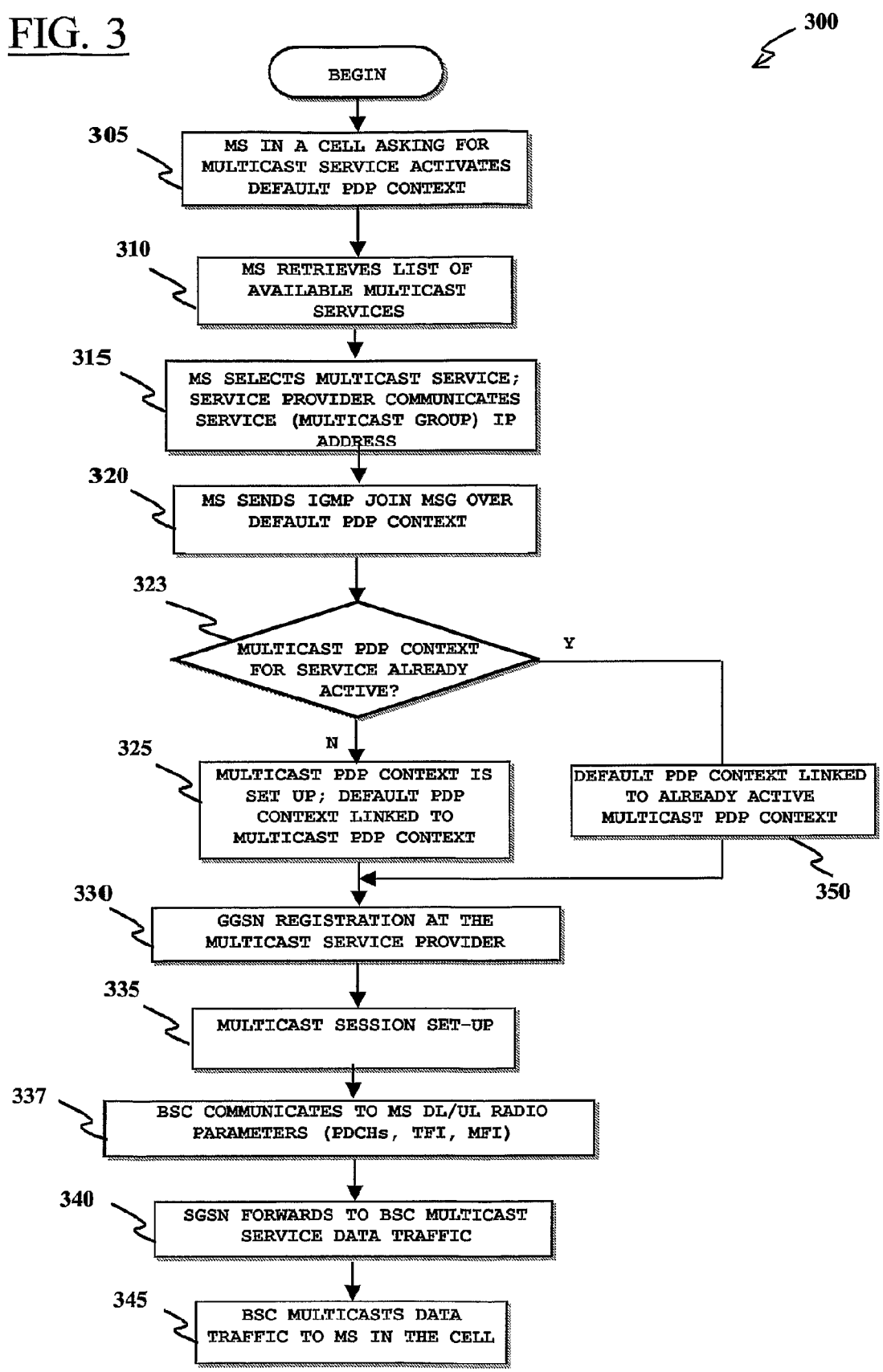

METHOD AND SYSTEM FOR DISTRIBUTING MULTIMEDIA CONTENTS THROUGH A WIRELESS COMMUNICATIONS NETWORK, PARTICULARLY A MOBILE TELEPHONY NETWORK

CROSS REFERENCE TO RELATED APPLICATION

This application is a national phase application based on PCT/EP2004/050517, filed Apr. 14, 2004, the content of which is incorporated herein by reference.

BACKGROUND OF THE INVENTION

1. Field of the Invention

The present invention generally relates to the field of telecommunications, and more particularly to wireless, mobile communications networks, such as mobile telephony networks. Specifically, the invention concerns the distribution of relevant amounts of data, such as multimedia information contents, to mobile user terminals (e.g., mobile phones) through a wireless, mobile communications network.

2. Description of the Related Art

Mobile telephony networks were initially conceived for enabling voice communications, similarly to the wired, Public Switched Telephone Networks (PSTNs), but between mobile users.

Mobile telephony networks have experienced an enormous spread, especially after the introduction of second-generation mobile cellular networks, and particularly digital mobile cellular networks such as those complying with the Global System for Mobile communications (GSM) standard (and its United States and Japanese counterparts).

The services offered by these cellular networks in addition to plain voice communications have rapidly increased in number and quality; just to cite a few examples, Short Messaging System (SMS) and Multimedia Messaging System (MMS) services, and Internet connectivity services have been made available in the last few years.

However, these second-generation cellular networks, albeit satisfactory for voice communication, offer very poor data exchange capabilities.

Similarly to the PSTNs, second-generation cellular networks are in fact switched-circuit networks; this greatly limits the bandwidth that can be allocated for a given user. On the contrary, data communications networks such as computer networks and, among them, the Internet, adopt packet switching schemes, which allow much higher data transfer rates.

Some solutions have been proposed to overcome the limitations of conventional, switched-circuit cellular networks such as the GSM networks, so as to enable users of mobile terminals efficiently exploiting services offered through the Internet.

One of the solutions that have acquired a significant popularity is the General Packet Radio Service (shortly, GPRS). The GPRS is a digital mobile phone technology compatible with GSM networks (actually, built on the existing GSM network architecture) that enables data transfer at a speed higher than that allowed by pure GSM.

Essentially, the GPRS can be viewed as a GSM add-up that supports and enables packet-based data communication.

Although third-generation wireless communications systems such as those complying with the Universal Mobile Telecommunication System (UMTS) are more promising in terms of data transfer rates, the GPRS is a ready-at-hand solution for enhancing the data exchange capabilities of already existing GSM networks, and is therefore gaining an increasing popularity.

In GPRS communications networks the information content is usually transferred in a point-to-point modality (unicasting), upon activation of a session between a GPRS mobile phone (or mobile station) and a service provider connected to a packet data network, e.g. a server connected to the Internet; the activation of such a session involves the setting up of logic connections between the server and the GPRS mobile phone.

In such a point-to-point communication mode, the radio resources to be allocated for the exchange of data between the ground GPRS network and the GPRS mobile stations depend on the number of different mobile stations simultaneously exploiting the GPRS services, even if the same GPRS service is being exploited by two or more mobile station users at the same time. Clearly, this limits the possibility of simultaneously accessing available GPRS services by several users, unless the radio resources are overdimensioned.

Thus, it would be desirable to have the possibility of delivering information contents related to a same GPRS service exploitable by two or more users at a time through a point-to-multipoint transmission mode, saving the amount of allocated resources.

The problem of broadcasting relatively massive information contents, such as multimedia (audio and/or video) contents, to several mobile terminal users has already been faced in the art.

In particular, the 3GPP ($3^{rd}$ Generation Partnership Project) Technical Specification No. TS 23.246 ("Multimedia Broadcast/Multicast Service (MBMS); Architecture and functional description"), v6.1.0, December 2003, whose teachings are herein incorporated by reference, describes the architectural solution and functionalities for MBMS.

The above-referred Technical Specification deals with the "core network" aspects, and does not cover the physical, radio communications aspects involved in the implementation of a MBMS.

Multicast transmission in GPRS networks is also dealt with in the International application No. WO 03/019840 A2. The method proposed in that document provides for routing through a cellular network only a single copy of multicast data to a plurality of mobile stations in a cell; a virtual subscriber mobile station is emulated, that subscribes to a multicast service and receives the multicast data for the cell. The real mobile stations that should receive the multicast data are instructed to listen to, and consequently tune to a channel assigned to the virtual subscriber.

The Applicant observes that the implementation of the proposed method is not free of costs, because it involves modifying in a significant way the network apparatuses governing the radio communications. In particular, elements are needed to emulate the virtual mobile station.

Furthermore, the Applicant observes that the proposed method shows an additional and more severe drawback: the different mobile stations in a cell that are exploiting a given multicast service are indistinguishable for the network apparatuses, which are thus impossibilitated to address information to a specific mobile station.

In the Applicant opinion, this is a severe limitation, for example because it makes impossible to implement efficient policies of acknowledge/not-acknowledge of the distributed content.

According to a submission recently made at the GERAN2 #18 Meeting, held in Phoenix, Ariz., U.S.A. from Mar. 22 to Mar. 26, 2004 (the text of which can be downloaded from the Internet site ftp://ftp.3gpp.org/TSG_GERAN/

WG2_protocol_aspects/GERAN2__18bis_Phoenix/Docs/ G2-040286, entitled "Common Feedback Channel for MBMS delivery", there is proposed to define a Common Feedback CHannel (CFCH) intended to be used as a feedback channel, where negative acknowledgments (nack) are sent as access bursts at precise times. More specifically, according to the proponents, feedback messages are sent by all interested Mobile Stations (MSs) as access bursts on the CFCH at a precise time: if MS does not decode the RLC block transmitted at time t, it will send an access burst at time t+Δt; if a MS successfully decodes the RLC block transmitted at time t, nothing is transmitted on the feedback channel at time t+Δt.

The consequence is that, if an access burst is detected at time t+Δt (the network could infer that one or more MSs have sent a nack from the increased received power on the feedback channel), the network realizes that the block transmitted at time t has not been received (at least) by one MS.

The proponents observe that if several MS's send access bursts at the same time and they collide, there might be no problem since they all carry the same info (i.e. loss of block sent at time t). The information is not the content of the access burst, but the presence of the access burst itself.

The Applicant however is of the opinion that this implementation of the feedback from the MSs is not suitable to implement efficient acknowledge/not-acknowledge policies. For example, this implementation does not allow to recognize if a series of nack responses may be ignored because it is coming from a mobile station located in a geographical area in which the signal reception is very poor. As another example, this implementation cannot allow a better tuning of some parameters of the mobile stations in order to increase the quality of the reception of the data contents, such as for example the Timing Advance of the mobile stations. It is also noticed that the proponents of the cited solution clearly state that their goal is not to realize a fully acknowledged protocol.

The Applicant has faced the problem of implementing a MBMS service in which information may be specifically addressed to different mobile stations (for example an ack/nack request), and in which information from the mobile stations can be recognized and distinguished (for example, in order to get an ack/nack feedback), by suitable network equipment.

SUMMARY OF THE INVENTION

The Applicant has found that the mobile stations in a cell that are exploiting a given multicast service, and thus would be indistinguishable for the network (because they share the same physical communication resources) can be rendered distinguishable from each other by defining a radio link identifier, preferably adapted to be included in a header of the radio blocks sent to the mobile stations for the multicast service, and communicating such an identifier to the mobile stations. This allows the implementation of, for example, more efficient data retransmission schemes.

According to an aspect of the present invention, there is therefore provided a method for distributing data packets to mobile stations through a wireless communications network.

Summarizing, in a wireless communications network comprising a base station subsystem controlling at least one network cell, and in which the base station subsystem communicates with mobile stations in the cell through radio blocks, the method according to this aspect of the invention comprises:

obtaining, starting from the data packets, radio blocks to be transmitted through the network cell;

labeling said radio blocks with a first radio link identifier, identifying a logic connection between a mobile station and the base station subsystem;

communicating the first radio link identifier to a first mobile station in the network cell; and in case at least one second mobile station in the network cell asks to receive the information contents, communicating thereto said first radio link identifier.

The method further comprises having the first mobile station and the at least one second mobile station assigned respective second radio link identifiers, to be included in said radio blocks.

In an embodiment of the present invention, said first radio link identifier comprises a Temporary Flow Identity (TFI) corresponding to a Temporary Block Flow (TBF) activated by the base station subsystem for delivering the information contents to the mobile stations.

In particular, said second radio link identifiers are univocally assigned to each mobile station.

In a preferred embodiment of the invention, said step of having the first and the at least one second mobile stations assigned respective second radio link identifiers includes assigning to the first and the at least one second mobile stations parameters useful for enabling a synchronization of the radio communication between the MS and the base station subsystem.

Said step of having the first and the at least one second mobile stations assigned respective second radio link identifiers may be performed by the base station subsystem on request by the mobile stations, or automatically in reply to a service request from the mobile stations. In particular, this step may be performed before starting to transmitting the radio blocks and, even more particularly, it may be performed before or after said step of communicating said first radio link identifier to said first and said second mobile stations.

In an embodiment of the invention, the method comprises having every mobile station in excess of a predetermined number assigned a common second radio link identifier.

In particular, said step of having the first and the at least one second mobile stations assigned respective second radio link identifiers may comprise establishing a temporary communication uplink from the mobile stations to the base station subsystem. Preferably, the temporary communication uplink is released before transmitting through the network cell said radio blocks obtained from said data packets.

Information can be addressed to a selected mobile station among the first and the at least one second mobile stations using the respective second radio link identifier; to this purpose, the second radio link identifier may be included in at least one radio block obtained from said data packets, particularly in a header portion thereof.

In particular, said step of addressing information further comprises requesting the selected mobile station to provide an answer; said answer may requesting the mobile station to provide acknowledge information on the successful receipt of the radio blocks obtained from the data packets. In particular, said answer may be transmitted to the base station subsystem on a control channel associated with a channel on which the radio blocks are transmitted. The method may include retransmitting already transmitted radio blocks obtained from the data packets depending on the acknowledge information received from the mobile stations.

According to another aspect of the present invention, a wireless communications network system is provided, for distributing information contents provided in data packets by an information content provider to mobile stations through a wireless communications network.

Summarizing, the wireless communications network system comprises:

a network base station subsystem enabling wireless communications with a plurality of mobile stations located in a network cell through radio blocks, the base station subsystem being adapted to receiving information contents in data packets, obtaining radio blocks from the data packets, labeling the radio blocks with a first radio link identifier to be communicated to a first mobile station in the network cell and to at least one second mobile station in the network cell asking to receive the information contents, transmitting the radio blocks.

The base station subsystem is also adapted to assigning respective second radio link identifiers to the first mobile station and to the at least one second mobile station, the second radio link identifiers being adapted to be included in said radio blocks.

In particular, said first radio link identifier comprises a Temporary Flow Identity (TFI) corresponding to a Temporary Block Flow (TBF) activated by the base station subsystem for delivering the information contents to the mobile stations.

The base station subsystem may be adapted to univocally assigning said second radio link identifiers to each mobile station.

The base station subsystem may be further adapted to assigning to the first and at least one second mobile stations parameters useful for enabling a synchronization of the radio communications between the mobile stations and the base station subsystem.

The base station subsystem may be adapted to assigning the second radio link identifiers on request from the mobile stations, or automatically in reply to a service request from the mobile stations. In particular, the base station subsystem may be adapted to assigning the second radio link identifiers before starting the distribution of the information contents, in particular before or, alternatively, after communicating the first radio link identifier to the mobile stations.

The base station subsystem may be adapted to assigning a common second radio link identifier to every mobile station in excess of a predetermined number.

The base station subsystem may be further adapted to establishing a temporary communication uplink from the mobile stations to the base station subsystem before starting to transmitting the radio blocks.

In an embodiment of the invention, the base station subsystem is adapted to addressing information to a mobile station among the first and the at least one second mobile stations using the respective second radio link identifiers; in particular, the second radio link identifier may be included in at least one of the radio blocks obtained from the data packets.

In an embodiment of the invention, the base station subsystem is adapted to requesting the addressed mobile station to provide an answer, in particular, to provide acknowledge information on the successful receipt of the radio blocks obtained from said data packets. The base station subsystem may also be adapted to retransmitting already transmitted radio blocks obtained from said data packets, depending on the acknowledge information received from the mobile stations.

In particular, said answer may be transmitted on a control channel associated with a channel on which the radio data blocks are transmitted.

According to a third aspect of the present invention, a mobile station is provided for use in a wireless communications network supporting the distribution to the mobile stations of information contents provided in data packets by an information content provider, the information contents being transmitted to the mobile stations in radio blocks labeled by a first radio link identifier, particularly a Temporary Flow Identity (TFI) corresponding to a Temporary Block Flow (TBF) activated for delivering the information contents to the mobile stations, communicated by the base station subsystem to the mobile stations.

Summarizing, the mobile station is adapted to:

storing an own second radio link identifier assigned thereto;

recognizing a received radio block as including a second radio link identifier;

extracting from the received radio block the second radio link identifier; and comparing the extracted second radio link identifier with said own second radio link identifier.

In particular, the mobile station may be further adapted to considering itself addressed by the network in case said extracted second radio link identifier matches the own second radio link identifier.

In particular, the mobile station is further adapted to providing to the network information on the successful receipt of the radio blocks delivering the information contents when addressed through the personal second radio link identifier.

Said first radio link identifier comprises a Temporary Flow Identity (TFI) corresponding to a Temporary Block Flow (TBF) activated for delivering the information contents to the mobile stations.

BRIEF DESCRIPTION OF THE DRAWINGS

These and other features and advantages of the present invention will be made apparent by the following detailed description of an embodiment thereof, provided merely by way of non-limitative example, description that will be conducted making reference to the attached drawings, wherein:

FIG. 3 is a schematic flowchart illustrating the operation of the GPRS network of FIG. 1, in respect of a generic multicast service;

DETAILED DESCRIPTION OF THE INVENTION

Figure 1:
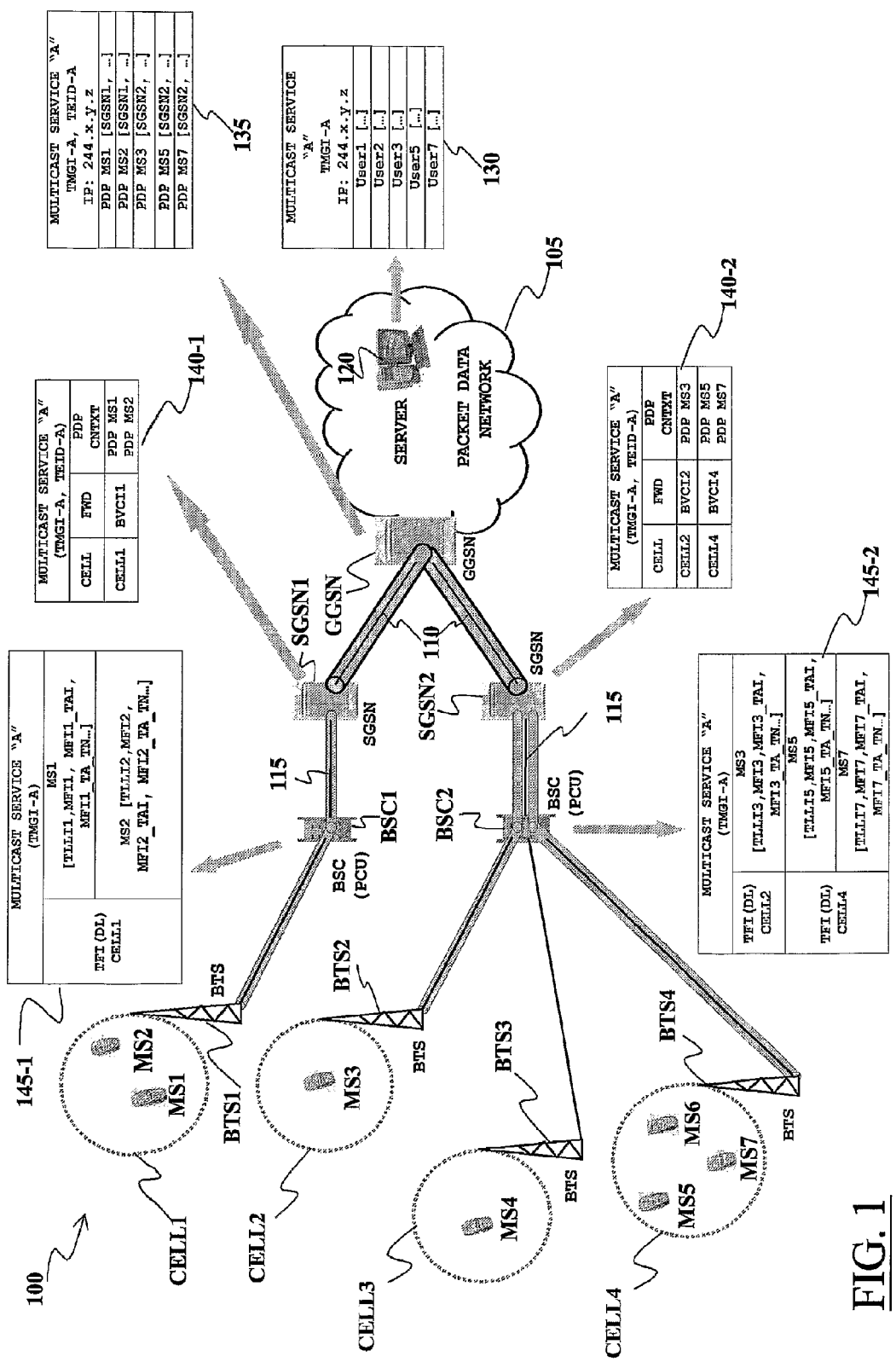
FIG. 1 is a schematic view of a GPRS network supporting multicast services, adapted to implement a method according to an embodiment of the present invention.

With reference to the drawings and, particularly, to FIG. 1, a cellular mobile communications network 100, particularly a GSM network, is schematically shown.

The mobile communications network 100 comprises a plurality of Base Station Subsystems (BSSs), each one providing coverage for cellular communications in a respective geographic region.

The generic BSS comprises a plurality of Base Transceiver Stations (BTSs), each one covering a respective geographic area within the region covered by the BSS; the number of BTSs in a BSS may be in the practice rather high but for simplicity of the drawing, only four BTSs BTS1, BTS2, BTS3 and BTS4 (pictorially represented by an antenna) with an associated cell CELL1, CELL2, CELL3 and CELL4 (schematically depicted as an area surrounded by a dashed circle) are shown in FIG. 1. The generic BTS communicates with users' Mobile Stations (MS), typically cellular phones, which are located in the BTS's cell, such as the MSs MS1 and MS2 within the cell CELL1, the MS MS3 within the cell CELL2, the MS MS4 within the cell CELL3 and the MSs MS5, MS6 and MS7 within the cell CELL4.

Typically, a plurality of BTSs are connected to a same Base Station Controller (BSC), a network unit that controls the BTSs; for example, all the BTSs of a same BSS are connected to a same BSC, such as, making reference to FIG. 1, the BSC BSC1 to which the BTS BTS1 is connected, and the BSC BSC2 to which the other three BTS BTS2, BTS3 and BTS4 are connected. Roughly speaking, the BTSs handle the actual transmission/reception of signals to/from the MSs, whereas the BSCs instruct the different BTSs about which data have to be transmitted on specified physical, radio communication channels.

FIG. 1 schematically depicts network elements that, according to the GPRS standard, enable the MSs, connected to the cellular mobile communications network 100, to access an external packet-based data communications network (shortly, a packet data network) such as, for example, the Internet and/or an Intranet, more generally any data communications network in which data are exchanged in packets, i.e. according to a packet-switched scheme instead of a switched-circuit one, particularly but not limitatively any network adopting the Internet Protocol (IP). In the drawing, the external packet data network is shown only schematically, and it is identified globally by 105; hereinafter, it will be assumed that the external packet data network 105 is the Internet, but this is not to be intended as a limitation, being merely an example.

Without entering into excessive details, known per-se in the art and not relevant to the understanding of the invention embodiment herein described, at least one Gateway GPRS Support Node (GGSN) GGSN is provided to act as an interface between the cellular network 100 and one or more external packet data network, such as the Internet 105. The GGSN GGSN exchanges data packets, through a GPRS backbone network 110, with one or more Serving GPRS Support Nodes (SGSN), such as the two SGSNs SGSN1 and SGSN2 shown in the drawing. The generic SGSN is associated with one or more respective BSSs, and routes the data packets received, through the GGSN (or one of the GGSNs, if more than one GGSN exist) and the GPRS backbone network, from the external packet-based communications network (or one of the external. packet-based communications networks), to the proper destination MS, located in the geographic area covered by the respective BSS (or by one of the respective BSSs); for example, the SGSN SGSN1 routes the data packets received, through the GGSN GGSN and the GPRS backbone network 110, from the external packet-based communications network 105 to the MS MS1 and/or the MS MS2.

In particular, the generic SGSN keeps track of the geographical location of the MSs, so as to know whereto the data packets are to be routed in order to be delivered to the intended destination MS. In particular, depending on the fact that the MS is actively exchanging data (a condition referred to as READY status) or not (a condition referred to as STAND-BY) the geographical location of which track is kept at the SGSN may be a specific network cell, or a larger area represented by a group of cells, referred to as a "routing area". In other words, the generic SGSN is aware of which cell/routing area the destination MS is currently located. It is observed that a single SGSN may communicate with a plurality of GGSN, for receiving data packets from different external packet data networks.

In order to provide data packet-based communications services, each BSC is associated with a respective Packet Control Unit (PCU), not explicitly shown in the drawing because intended as part of the BSCs. The PCU behaves as an interface of the BSC to a packet-based data communications network 115 internal to the cellular network 100 and connecting the BSC to a respective SGSN, such as the SGSN SGSN1 for the BSC BSC1 and the SGSN SGSN2 for the BSC BSC2. The PCU converts the data packets, received from the respective SGSN through the internal packet-based data communications network 115 and directed to the destination MS, into data streams adapted to being transmitted "over the air", by one of the BTSs, exploiting the radio resources of the network. Furthermore, data streams transmitted by the MS "over the air" and received by the BTS are converted into data packets formatted according to the protocol supported by the internal packet-based data communications network 115, for transmission to the respective SGSN, in the drawing the SGSN SGSN1 or SGSN2, and to the GGSN GGSN.

Conventionally, the procedure for enabling the user of a generic MS supporting GPRS communications (a GPRS MS), for example the MS MS1 in the cell CELL1, to exploit services provided by a service provider or content provider 120 (the server) accessible through the Internet 105 or, shortly stated, the fruition by a GPRS MS of a GPRS service essentially involves two steps: a first step (called Packet Data Protocol—PDP—context activation) in which a logic connection (the PDP context) is created between the GPRS MS MS1 and the server 120 providing the service contents; and a second step (called Temporary Block Flow—TBF—activation/release) in which the cellular network 100 assigns to the GPRS MS MS1 prescribed physical communication resources, namely radio resources for transmission on the "over the air" radio link portion of the cellular network 100.

In particular, without entering into excessive details well known to those skilled in the art, the GPRS MS MS1 (after having registered at the SGSN serving the cell CELL1 in which the GPRS MS MS1 is located at that moment, in the example the SGSN SGSN1) sends to the SGSN SGSN1 a request for activation of a PDP context; the PDP context defines the packet data network to be used (in the example, the Internet 105), the GGSN to be used for accessing the Internet 105 (the GGSN GGSN in the present example), and other parameters.

The PDP context request triggers a PDP context activation procedure in which the MS MS1, the SGSN SGSN1 and the GGSN GGSN exchange information useful to negotiate PDP context parameters.

The PDP context activation procedure results in the definition of a data packets transfer path between the GGSN GGSN and the PCU servicing the BTS BTS1 that covers the cell CELL1 in which the MS MS1 is located. A PDP context, i.e. a logic connection between the GPRS MS MS1 and the server 120 is thus created.

The activation of the PDP context does not involve per-se the allocation of physical communication resources of the cellular network 100, but merely establishes a logic connection between the GPRS MS and the server; thus, the PDP context, once activated, may be kept active for hours, in principle forever, even when there are no data to be exchanged between the server 120 and the GPRS MS MS1, until the GPRS MS MS1 (or, possibly, the server 120) deactivates it.

After the PDP context has been activated, the BSC BSC1 checks whether there are data received from the server 120 through the respective PCU to be transmitted to the GPRS MS MS1; in the affirmative case, i.e. when there are data to be exchanged between the server 120 and the GPRS MS MS1, a TBF is activated by the BSC BSC1.

In greater detail, as mentioned in the foregoing, a generic GPRS MS can be in one of two states, referred to as a READY state and a STAND-BY state; if in STAND-BY, the competent SGSN is not aware of which cell the MS is in that moment located, but only of the routing area; a paging message is preliminary sent by the SGSN to the MSs within the routing area, the message including an identifier of the MS of interest; when the MS replies to the paging message, the SGSN becomes aware of the cell in which the MS is located, and can properly route the data packets towards the BSC servicing the MS.

The activation of the TBF determines the allocation of physical radio communications resources of the cellular network 100, i.e. of a radio channel (an airlink channel), to the MS MS1 for enabling the exchange of the data packets from the data transfer path (converted in a suitable data stream by the PCU) through the proper BSC and BTS BSC1 and BTS1 over the air to the MS MS1.

When the data have been exchanged, the TBF is deactivated and the radio resources are released; provided the PDP context is not closed, the BSC BSC1 waits for new data to be exchanged. Thus, differently from the PDP context, the TBF, i.e. the physical, radio communications resources of the GSM network 100 are kept allocated for the MS MS1 only as long as there are data to be transmitted/received to/from it and are released as soon as the data have been exchanged, keeping the radio resources free for other uses/users. In other words, a TBF is temporary and is maintained only for the duration of the data transfer.

According to the GPRS standard, to each TBF an indicator is univocally assigned, called Temporary Flow Identity (TFI). Roughly speaking, the TFI is exploited for managing the scheduling of the data to be transmitted in downlink (i.e., from the BSC and BTS BSC1 and BTS1 to the destination MS MS1); different GPRS service users within a same cell are assigned different TFIs. The TFI allows discriminating between different entities at the Radio Link Control (RLC) layer, that is, a given TFI univocally addresses a respective RLC entity and is inserted in a header portion of all the RLC data blocks transmitted. Typically, the TFI is a five-bit binary number. When the TBF is activated, a TFI is assigned thereto and such a TFI is communicated to the destination MS MS1 by means of the messages exchanged during the access procedure (through a so-called PACKET DOWNLINK ASSIGNMENT message). The TFI is an identifier of the logic connection between the BSC and the MS.

At the physical level, the GPRS is based on the physical layer of the GSM standard.

As known in the art, the GSM standard provides, for the communications between the BTSs and the MSs, a plurality of radio channels having a bandwidth of 200 KHz, associated with a plurality of radio carriers; particularly, 124 radio carriers are provided, and a hybrid Frequency Division Multiple Access (FDMA)/Time Division Multiple Access (TDMA) access scheme associates a number, e.g. eight, of time slots (physical channels) with each carrier.

The transmission to/from a given MS takes place discontinuously, only within the time slot cyclically assigned to that MS; a cycle is the succession in time of all the eight time slots, and is referred to as a radio frame. Once the MS has been granted access to a given carrier the transmission and reception are accomplished in distinct time slots.

The physical level used by the GPRS system is based on the GSM one, superimposing thereto a different logic structure. Control and data traffic "logical" channels are multiplexed in time and frequency division on a single GPRS physical channel, called Packet Data CHannel (PDCH).

A PDCH corresponds to a physical GSM channel, and is defined, in the frequency domain, by a radio carrier number (one of the 124 carriers), and, in the time domain, by a timeslot number (one of the eight timeslots within that carrier). The timing and duration of the timeslots are identical to those defined for the GSM system.

The control and data traffic GPRS logical channels are multiplexed in time so as to share the same PDCH at physical level.

Figure 2:
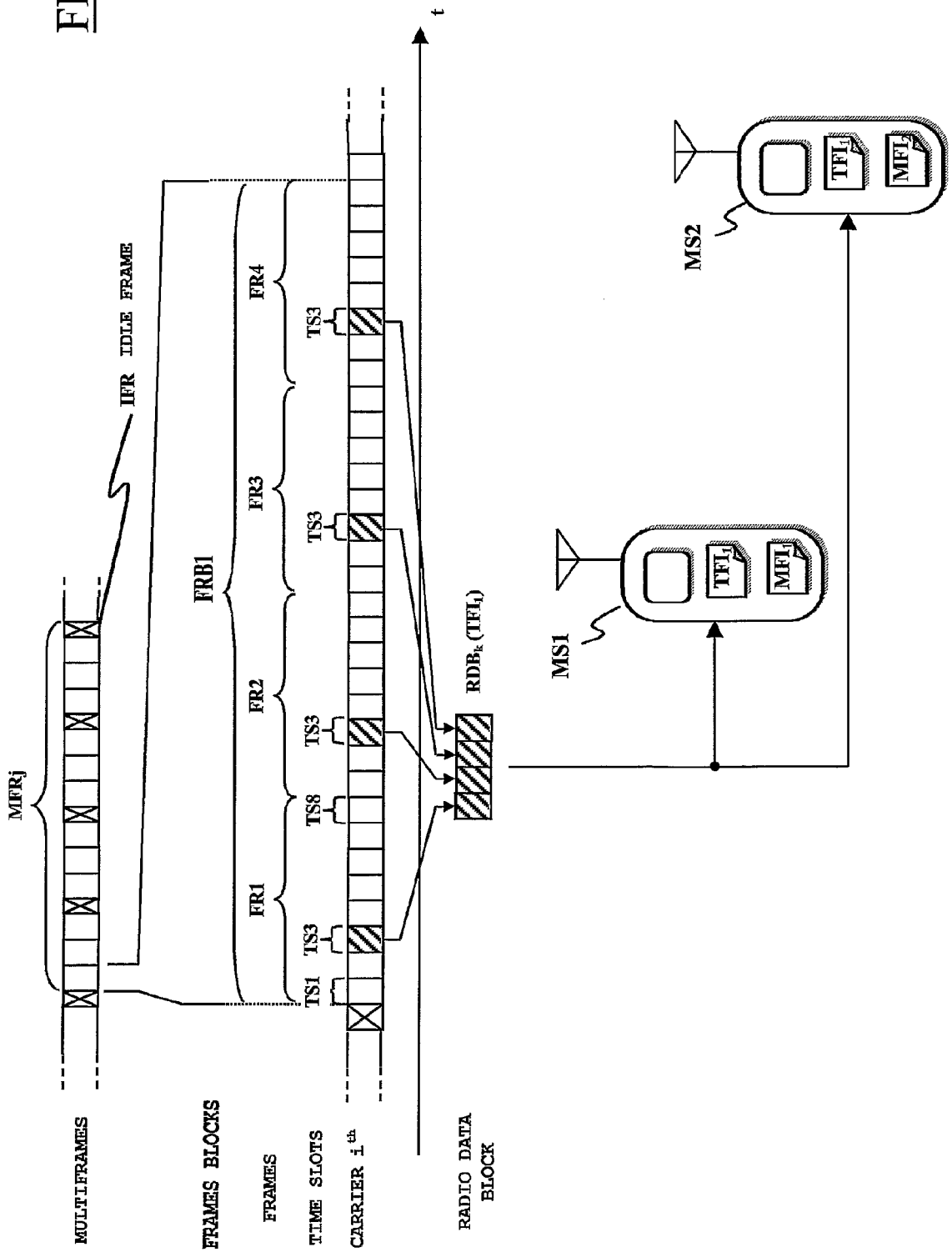
FIG. 2 schematically shows how data relating to a same GPRS service are distributed in multicast to several mobile stations in a cell at a time, without a waste of radio resources, in one embodiment of the present invention.

As pictorially shown in FIG. 2, given a prescribed radio carrier ("CARRIER $i^{th}$" in the drawing), which is one of 124 radio carriers of the GSM standard, the radio frames (each one including eight time slots TS1 to TS8) are grouped in groups of fifty-two radio frames, so as to form a so-called multiframe, such as the multiframe MFRj depicted in the drawing. Each multiframe is subdivided into twelve frame blocks, such as the frame block FRB1 shown in the drawing, including each one four radio frames. Between adjacent triplets of frame blocks, an idle frame IFR is interposed, left deliberately free of data.

The multiframe periodically repeats every fifty-two radio frames. The different GPRS control and data traffic logic channels are multiplexed together based on a subdivision (an operation referred to as segmentation) into blocks (Radio Data Blocks or RDBs) of the data (received in packets) to be transmitted. The radio data blocks are the basic transport structure of a GPRS logic channel: a given radio data block is thus univocally dedicated to a respective GPRS logic channel, being it a data traffic channel or a control channel. The assignment scheme of the radio data blocks to the different logic channels is transmitted, together with other control information, over a GPRS control logic channel PBCCH (Packet Broadcast Control CHannel), having a fixed position within the multiframe.

As for voice communications, radio transmission takes place as a sequence of four "normal bursts", according to the GSM standard specification. Every radio data block, such as the radio data block $RDB_k$ shown in the drawing, is transmitted during four consecutive radio frames of the same PDCH, such as the frames FR1 to FR4 in the drawing, exploiting one (possibly more, depending on the radio resources allocated to that logic channel, and on the fact that the MS supports multislot communications, a feature referred to as the multislot class of the MS) time slot in each frame, such as the timeslot TS3 in the drawing.

Still according to the GPRS standard, every radio data block includes a header portion containing the TFI that univocally identifies the TBF, in addition to other parameters. In this way, two or more traffic flows belonging to different users can be multiplexed on a same timeslot, or group of timeslots, in downlink or in uplink to or from the MSs.

Each MS in a cell listens to every radio data block transmitted by the BTS on the group of timeslots assigned to the MS; however, an MS being destination of GPRS data, that is an MS such as the MS MS1 having activated a PDP context, having been assigned a TBF, e.g. $TBF_1$, and having been assigned and communicated a respective TFI, e.g. $TFI_1$ (in the practice, the above mentioned five-bit digital code) only captures those radio data blocks that, similarly to the radio data block $RDB_k$ in the drawing, are labeled by that TFI $TFI_1$, i.e. by the TFI that has previously been communicated thereto, when the TBF was activated; all the other radio data blocks, not labeled by the correct TFI $TFI_1$, are discarded by the MS MS1. The TFI is thus used by the MS substantially as a tuning information, which the MS uses for tuning onto the physical communication channel on which the GPRS data directed to the MS are transmitted.

In a GPRS network not supporting multicast services, if a different MS in the same cell as the MS MS1, for example the MS MS2 shown in FIG. 1, wishes to exploit, through the GPRS network, the same services made available by the server 120 as those being already exploited by the MS MS1, a procedure identical to that described in the foregoing has to be performed, leading to the activation of another PDP context and, even worse, to the activation of different TBFs when data have to be exchanged with the MS MS1, i.e. to the allocation of additional radio resources different from those already allocated by the GSM network 100 for the MS MS1. This is clearly a waste of resources, especially when the services exploited are relatively heavy in terms of data to be downloaded to the MSs, such as in the case of delivery of multimedia contents, audio or video (e.g. real-time contents such as for example television programs) streaming, and the availability of GPRS services offered to the users may be severely limited, unless the GSM network infrastructure is greatly overdimensioned.

In order to avoid such a waste of resources, the GPRS network is rendered capable of supporting multicast service data distribution, in the way described hereinbelow with the aid of the simplified flowchart 300 of FIG. 3.

In a way totally similar to the conventional procedure described above in respect of a generic GPRS service, when the user of a generic MS, e.g. the MS MS1, asks for a certain GPRS service which is offered in multicast (in the following simply referred to as a multicast service), the MS MS1 activates a standard, unicast PDP context (henceforth referred to as the default PDP context) (block 305). The GSM/GPRS network component BSC1 assigns to the MS MS1 the downlink (i.e., from the BCS/BTS to the MS) and uplink (i.e., from the MS to the BTS/BSC) data traffic radio channels, according to standard procedures carried out at the RLC/MAC levels.

The MS MS1 then retrieves the list of available multicast services from a dedicated server within the packet data network 105, for example (but not necessarily) the same server 120 offering the multicast services (block 310).

Upon selection by the MS MS1 of one of the available multicast services in the list of available services, for example the multicast service "A", for example a television TV) service, the server 120 communicates to the MS MS1 an identifier, which can be for example an Internet Protocol (IP) address, e.g. 244.x.y.z, assigned by the server 120 to the MS MS1 (block 315); this same IP address may be used by the server 120 to identify a multicast group associated with the GPRS service "A", i.e. a group of MSs which have requested to exploit/are exploiting the multicast service "A"; such a group is schematically depicted in FIG. 1 as a table 130, related to the multicast service "A" and intended to include information relating to the users User1, . . . , User7 that have requested to exploit/are exploiting the multicast service "A". The server 120 may assign to the multicast group 130 a Temporary Multicast Group Identity (TMGI), which is assigned to the multicast group temporarily as long as there is at least one MS in the multicast group.

The MS MS1 then sends an IGMP JOIN message (IGMP: Internet Group Management Protocol) over the default PDP context to signal its interest in joining the multicast group related to the selected multicast service "A" (block 320). As known in the art, the Internet Group Management Protocol is the standard for IP multicasting in the Internet, used to establish host memberships in particular multicast groups on a single network.

As a result, a multicast PDP context is set up by the competent GGSN GGSN (block 325), after having checked that one such multicast PDP context is not already active (decision block 323, exit branch N).

In particular, the multicast PDP context may be set up following the guidelines for service activation defined in the already cited 3GPP Technical Specification No. TS 23.246, v6.1.0.

During multicast PDP context set up the GGSN GGSN performs a registration procedure to the server 120 (block 330). The server 120 gets information about the MS MS1 and stores such information in the table 130 corresponding to the group for multicast service "A". The GGSN GGSN stores user information in a table (shown schematically in FIG. 1 and identified therein as 135) related to the multicast service "A" (several of such tables may exist at the GGSN, one for each multicast service for which a multicast PDP context has been set up). Similarly, the competent SGSN SGSN1, responsible of the MS MS1, stores user information in a cell-related table (shown schematically in FIG. 1 and identified therein by 140-1 (140-2 identifies an equivalent cell-related table at the SGSN SGSN2) related to the multicast service "A" (again, several of such tables may exist at the SGSN, one for each multicast service for which a multicast PDP context has been set up).

The operations that allow the MS MS1 joining the multicast group 130 are completed, and the default PDP context that was activated by the MS MS1 is linked to the multicast PDP context.

As a part of the operations that lead to the joining of the multicast group, the MS MS1 selects a Network Service Access Point Identifier (NSAPI—an index to the PDP context that is using the services provided by the lower layer) having a predetermined value $NSAPI_M$ (see FIG. 6), particularly an NSAPI value that has been reserved for multicast services.

Let it now be supposed that another MS, for simplicity of description an MS located in the same cell as the MS MS1, for example the MS MS2, asks for a GPRS multicast service.

Similarly to MS MS1, the MS MS2 activates a respective standard unicast PDP context (default PDP Context). The GSM/GPRS network component BSC1 assigns to the MS MS2 the downlink and uplink traffic radio channels, according to standard procedures at the RLC/MAC levels (block 305).

As in the previous case, the MS MS2 retrieves from the server 120 the list of available GPRS multicast services, among which there is the multicast service "A", for which a multicast PDP context bas already been set up (block 310). If the MS MS2 selects the multicast service "A", the server 120 communicates to the MS MS2 the IP address 244.x.y.z of the corresponding multicast group (block 315).

The MS MS2 then sends an IGMP JOIN message over its default PDP context, to signal the interest of the MS MS2 in the GPRS multicast service "A" (block 320).

The GGSN GGSN recognizes that a multicast PDP context for the multicast service "A" is already active (decision block 323, exit branch Y); thus, the GGSN GGSN does not activate another multicast PDP context, but instead links the new MS MS2 to the multicast PDP context already existing for the service "A" (block 350). Exception made for the fact that another multicast PDP context is not activated in the GGSN GGSN, signaling towards the MS MS2 may occur substantially in the same way as described before, following the guidelines for service activation defined in 3GPP Technical Specification No. TS 23.246 v6.1.0.

The GGSN GGSN stores information related to the new user in the table 135 related to the multicast service "A". Similarly, the competent SGSN SGSN1, responsible of the MS MS1, stores user information in the cell-related table 140-1 related to the multicast service "A".

The same acts may be performed in case other MSs asks to exploit the multicast service "A".

After having activated the multicast PDP Context related to service "A" and until the start of the multicast session (i.e., the sending of the data related to service "A" from the server 120 to the MSs), the MSs can move, possibly many times, from the READY state to the STAND-BY state and back, depending on users' activities.

The server 120 initiates the multicast session related to service "A" when it is ready to send data to the subscribers. A multicast session may be set up following the guidelines for session activation defined in the above-mentioned 3GPP Technical Specification No. TS 23.246 v6.1.0 (block 335).

Once the multicast session has been set up, and the server 120 is ready to deliver the multicast service "A", after a preliminary procedure (that will be explained in the following) by which the users (e.g., the MSs MS1 and MS2) that have registered for receiving the multicast service "A" are signaled about the imminent start, and the necessary radio resources are assigned thereto (block 337), the SGSN (e.g., SGSN1) starts forwarding to the BSC (in the example, the BSC BSC1) data traffic related to multicast service "A", on the basis of the information found in the respective cell-based table 140-1 (block 340). In particular, the SGSN SGSN1 receives data traffic from the GGSN GGSN through a GPRS Tunnel Protocol (GTP) tunnel whose Tunnel Endpoint IDentifier (TEID) corresponds to the multicast PDP context "A" (only one GTP tunnel, identified by a unique TEID), is created in respect of a given multicast service). The SGSN routes the traffic towards the proper (PCU of the) BSC based on a BSSGP Virtual Connection Identifier (BVCI) (in FIG. 1, a BVCI BVCI1 identifies the cell CELL1 under BSC BSC1, a BVCI BVCI2 identifies the cell CELL2 under BSC2, and BVCI BCI4 identifies the cell CELL4 under BSC2). The TMGI may be used for univocally identifying the traffic related to the multicast service throughout the network, including the BSCs and the MSs.

For each network cell, common radio resources are exploited for delivering data traffic related to the multicast service "A" to all the various MSs of the group for the multicast service "A" that are located in that cell, and the respective radio parameters are communicated to the MSs. In particular, a common TFI is assigned by the network and communicated to the MSs, such as the TFI $TFI_1$ that is communicated to the MSs MS1 and MS2 in cell CELL1. Furthermore, at least one common PDCH (preferably, a plurality of common PDCHs) is assigned by the network and communicated to the MSs. The data traffic received at the BSC BSC1 in respect of the multicast service "A" is thus delivered to the MSs MS1 and MS2 (block 345).

As mentioned before, the SGSN SGSN1 forwards the data traffic related to multicast service "A" on the basis of the information contained in the corresponding cell-based table 140-1, particularly the BVCI. The generic SGSN scans the respective cell-related table corresponding to the multicast service "A", and forwards one traffic flow per each cell identified by the TMGI related to service "A"; for example, assuming that the MS MS3 in cell CELL2, and the user MS5 in the cell CELL4, activated respective multicast PDP contexts for receiving the multicast service "A", the SGSN SGSN2 forwards the traffic relating to such a service to these users on the shared connection; if other users in the respective cells, for example the user MS7 in the cell CELL4, ask to exploit the service "A", the respective SGSN, e.g. the SGSN SGSN2, does not forward additional traffic, and these other users, e.g. MS7, registered in the SGSN table under the same BVCI, receive the intended data traffic because they share the same TMGI and, in the respective cell (CELL4), the same downlink radio parameters PDCH(s) and TFI assigned for service "A".

In the Applicant's opinion, it is important to guarantee an adequate perception of the service from the users' point of view. To this purpose, according to the Applicant it is important that the network operation mode, at the RLC/MAC level, be an acknowledged one. This means that it is important for the network apparatuses to be able to establish if and to what extent the traffic related to the GPRS multicast services is properly received by the MSs of the users.

The above-described method of implementing multicasting in the GPRS/GSM network is particularly effective, and avoids unnecessary duplication, i.e. waste, of network resources, both at the core GPRS network level (no proliferation of data traffic directed to users in a same cell) and at the physical, radio communication level (a same number of radio channels are occupied, irrespective of the number of users receiving a given service).

However, as mentioned in the introductory part of the present description, a problem related to the above described implementation of multicasting in a GPRS network is that, being all the MSs in a given cell registered to a same multicast service multiplexed on the same PDCH(s) on the downlink and addressed via a same TFI, it is not possible for the network apparatuses to address information, on the down link, towards a specific MS of the multicast service group using the TFI.

This impossibility of individually addressing the MSs is, in the Applicant's opinion, a severe limitation, particularly in respect of the desire of implementing effective retransmission policies based on the acknowledgment/unacknowledgement of the data received by the users.

It is observed that, actually, even in a multicast service delivery context such as the one described in the foregoing, each MS involved in the service might be individually identified, using an identifier called Temporary Logic Link Identifier (TLLI), which, roughly speaking, is an identifier of the logic connection established between that MS and the competent SGSN. The TLLI is communicated to the MS when the MS registers for the multicast service. In principle, the TLLI might be used for addressing specific information towards the MSs. However, the TLLI is typically a relatively long number, for example 32 bits (four bytes) according to the current standards, so that, using the TLLI for addressing the MSs at the radio link level would mean a great decrease of available bandwidth for the transmission of data related to the multicast service.

According to an embodiment of the present invention, in order to overcome this limitation, a further parameter identifying the logic connection between the BSC and the MS (other than the TFI, which is common for all the MSs involved in multicast service) is defined and assigned, preferably by the network, to the MSs of a multicast service group, for specifying and, for example, addressing information to a specific MS among those which, being located in a same cell, receive in multicast a same GPRS service. In particular, in order to communicate the further parameter to the MSs, the BSC may compile a cell-based table of the MSs that have requested a generic multicast service, e.g. the service "A" herein considered by way of example. Two exemplary tables are schematically shown in FIG. 1, one for each BSC BSC1 and BSC2, and identified therein by 145-1 or 145-2. Hereinafter, the further parameter will be referred to for simplicity as the Mobile Flow Identity (MFI).

According to an exemplary and not limitative embodiment of the present invention, a given MS in a cell that belongs to a multicast service group is addressed by the network apparatuses by including the respective MFI (preliminary communicated to the MS according to any one of the exemplary procedures that will be described later on) in downlink messages, for example within a message carrying the multicast service data. In particular, a dedicated field may be exploited, which is included, when needed by the network apparatuses, in a properly extended RLC header of a generic one of the RLC/MAC radio blocks.

Figure 4A:
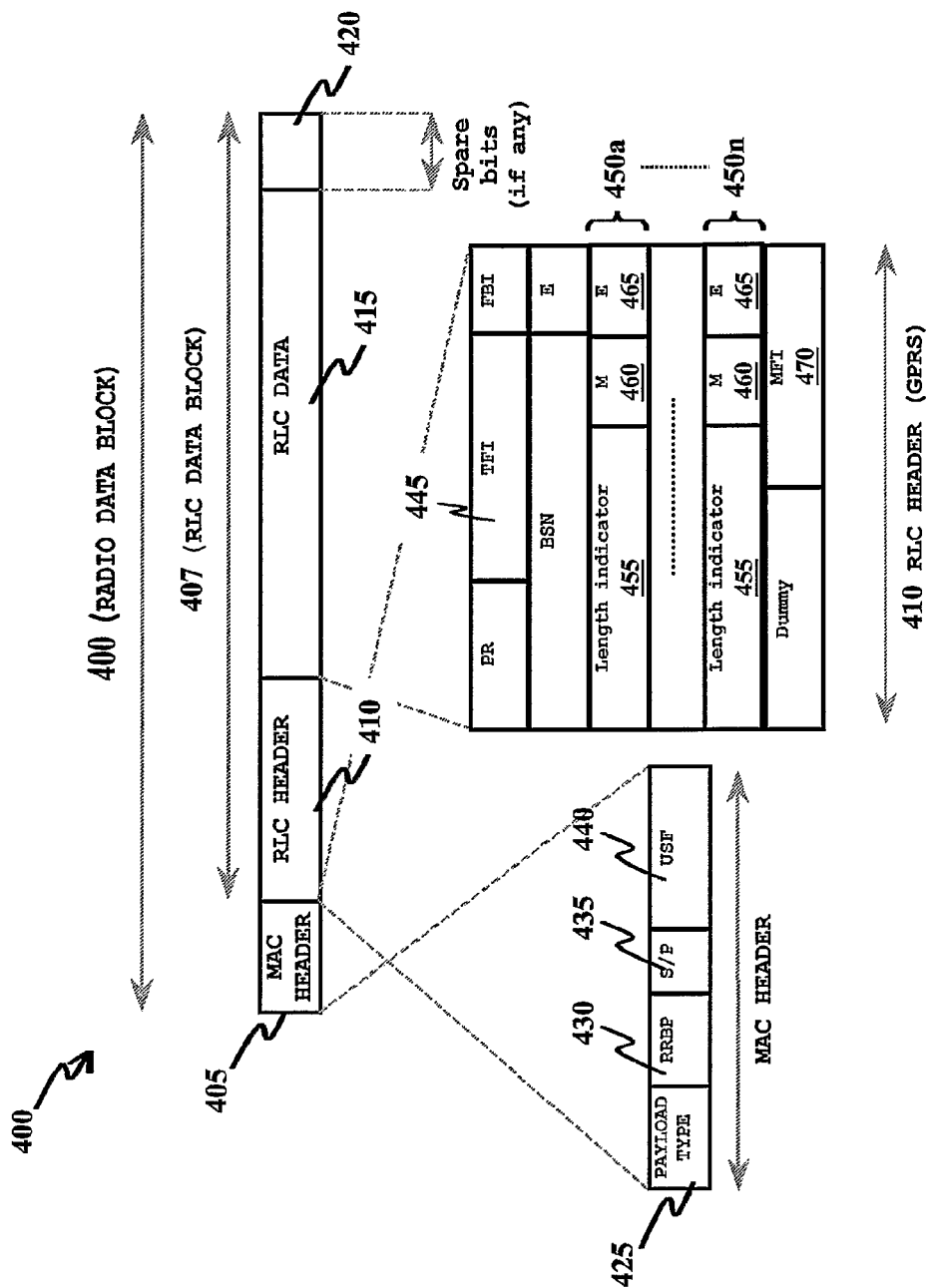
FIG. 4A is an exploded, more detailed pictorial representation of the structure of a GPRS radio data block, evidencing how users of a same multicast service are rendered distinguishable and individually addressable by the network apparatuses, in an embodiment of the present invention.

In greater detail, reference is made to FIG. 4A, wherein a more detailed pictorial representation of the structure of a generic GPRS radio data block is provided, in an exploded view.

The radio data block, globally identified by 400, includes a MAC header 405 and an RLC data block 407, comprised of an RLC header 410 and an RLC data portion 415, possibly terminating with one or more spare bits 420 (used, if necessary, as mere fillers for achieving the prescribed number of bits in the RLC data portion 415).

The MAC header 405 typically includes a first field 425, a second field 430 (Relative Reserved Block Period—RRBP), a third field 435 (Supplementary/Polling—S/P), and a fourth field 440 (Uplink State Flag—USF).

The first field 425 contains information specifying the payload type, and allows identifying if the block is a data block (i.e., a block carrying data) or rather a control block (i.e., a block carrying control information sent by the network to the MS). The RRBP field 430, if active, is used by the network apparatuses to reserve a single data block in uplink in which the MS shall transmit a message of the type PACKET CONTROL ACKNOWLEDGMENT or PACKET DOWNLINK ACK/NACK to the network; the value in the RRBP field 430 specifies after how many radio data blocks a given MS (addressed by the network as described in the following) has to reply. The S/P field 435 is used to indicate to the MSs that a response is required by the network (this field indicates whether the content of the field RRBP is valid or not). The USF field 440 is normally used on the PDCH to allow multiplexing of radio blocks from a number of MSs, and enables the coding of eight different USF states which are used to multiplex the uplink traffic. According to current standards, the MAC header has a fixed, constant length of eight bits.

Differently, the RLC header 410 does not have a constant length, its length being variable depending on the number of Logic Link Control-Packet Data Units (LLC-PDUs) transported by the respective radio data block.

The RLC header 410 comprises, in addition to other fields per-se known and not relevant to the understanding of the invention embodiment being described, a field 445 (typically of five bits) containing the TFI labeling the specific radio data block 400, and one or more octets 450a, . . . , 450n starting with a Length Indicator (LI) field 455 (of six bits) that defines the length of a corresponding LLC-PDU in the RLC data portion 415, a field Extension (E) 460 (of one bit), indicating whether there follows an additional octet 450a, . . . , 450n in the RLC header 410, and a field More (M) 465 (of one bit as well) indicating the presence of a further LLC-PDU in the Radio data block.

Figure 4B:
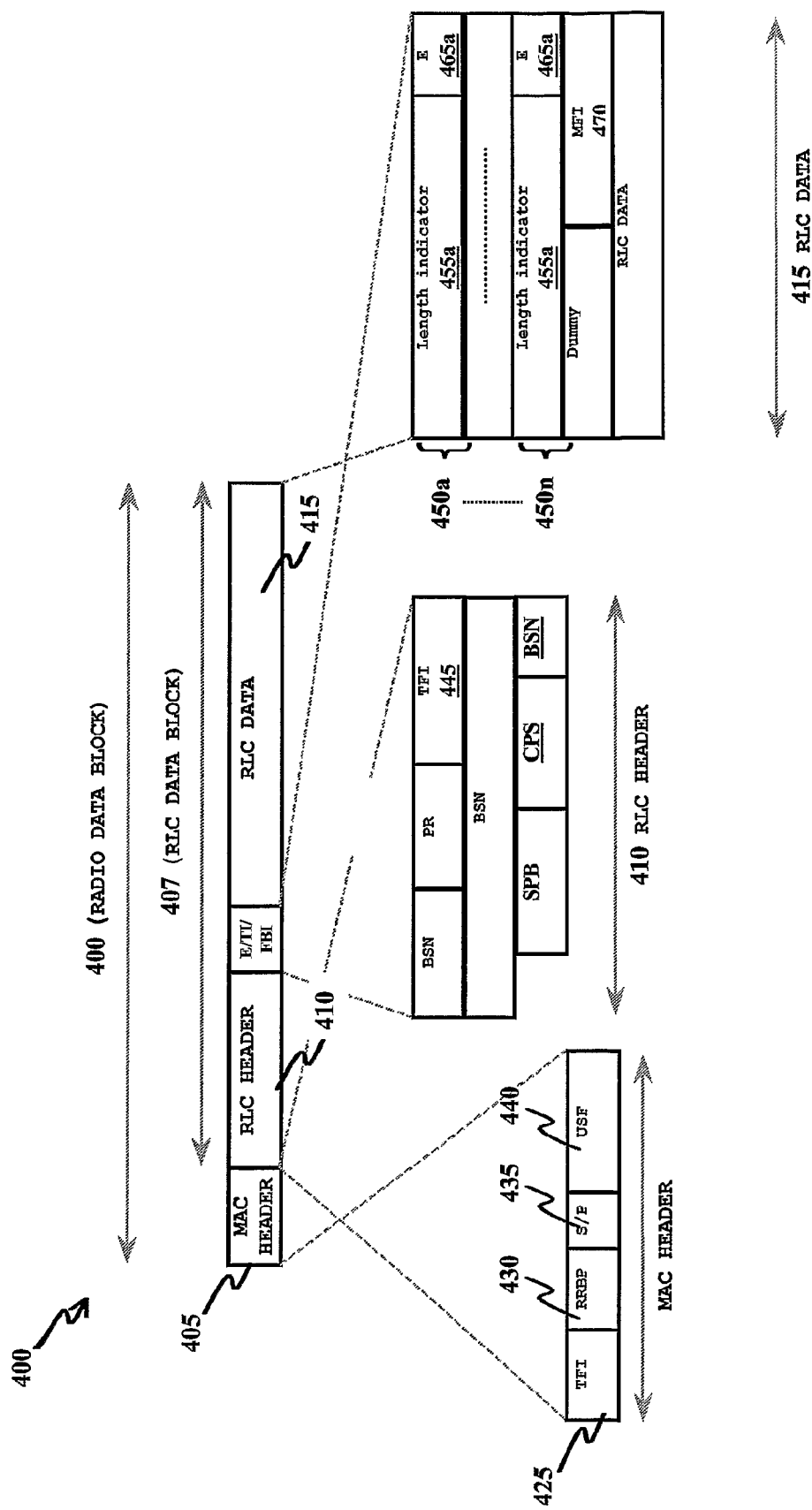
FIG. 4B shows a similar, exploded representation of the structure of a radio data block according to a EGRPS standard (for GMSK code schemes MCS1-MCS4)

It is observed that the above-described structure of the RLC header reflects the specifications for the current GPRS standard. In the current specifications for the Enhanced GPRS (EGPRS), also known as Enhanced Data rates for Global Evolution (EDGE), using the 8 PSK modulation technique to increase the data rate over that typical of plain GPRS, the structure of the radio data block is slightly different. For example, in FIG. 4B an exploded view of a generic radio data block according to the EGPRS GMSK code schemes MCS1 to MCS4 is provided. In this case, the first field 425 of the MAC header 405 contains a part of the TFI (the remaining part being included in the field 445 of the RLC header 410) the RLC data portion 415 of the radio data block 400 includes octets 450a, . . . , 450n each of which includes a seven-bit Length Indicator (LI) field 455a, and a one-bit field 465a, equivalent to the E field 465 of FIG. 4A. Similar structures may be found in the EGPRS GMSK code schemes MCS5 to MCS9.

According to an embodiment of the present invention, the additional identifier parameter of the BSC-MS logic connection assigned by the network apparatuses for individually addressing the MSs of a same multicast group and located in a same network cell, i.e. the MFI, can be formed by a number of bits equal to or higher than those necessary for the TFI, but roughly of the same order as the TFI, i.e. typically about five bits, a number substantially lower than the number of bits used to code the TLLI. In preferred embodiments, the MFI is formed by a number of bits from five to seven.

According to an embodiment of the present invention, the MFI is included in the RLC data portion 415 of a generic radio data block 400 transporting data related to the multicast service being distributed.

In order to include the MFI, the RLC header of a radio data block is properly extended to obtain an extended RLC header. According to an embodiment of the present invention, the extension of the RLC header necessary for signaling to the MS that an MFI is included in the RLC header is accomplished by setting the LI field 455 in one of the octets 450a, . . . , 450n, to a predetermined value, for example LI=55 in GPRS and LI=75 in EGPRS. The extended RLC header includes therefore an octet 450a, . . . , 450n with the Length Indicator field set to the prescribed value, plus the MFI.

Concerning the way in which the MFI is assigned and communicated by the network to the MSs, some possible MFI assignment procedures are hereinafter described in detail, being however intended that these procedures are merely exemplary, and are not to be intended as limitative for the present invention.

Figure 8A:
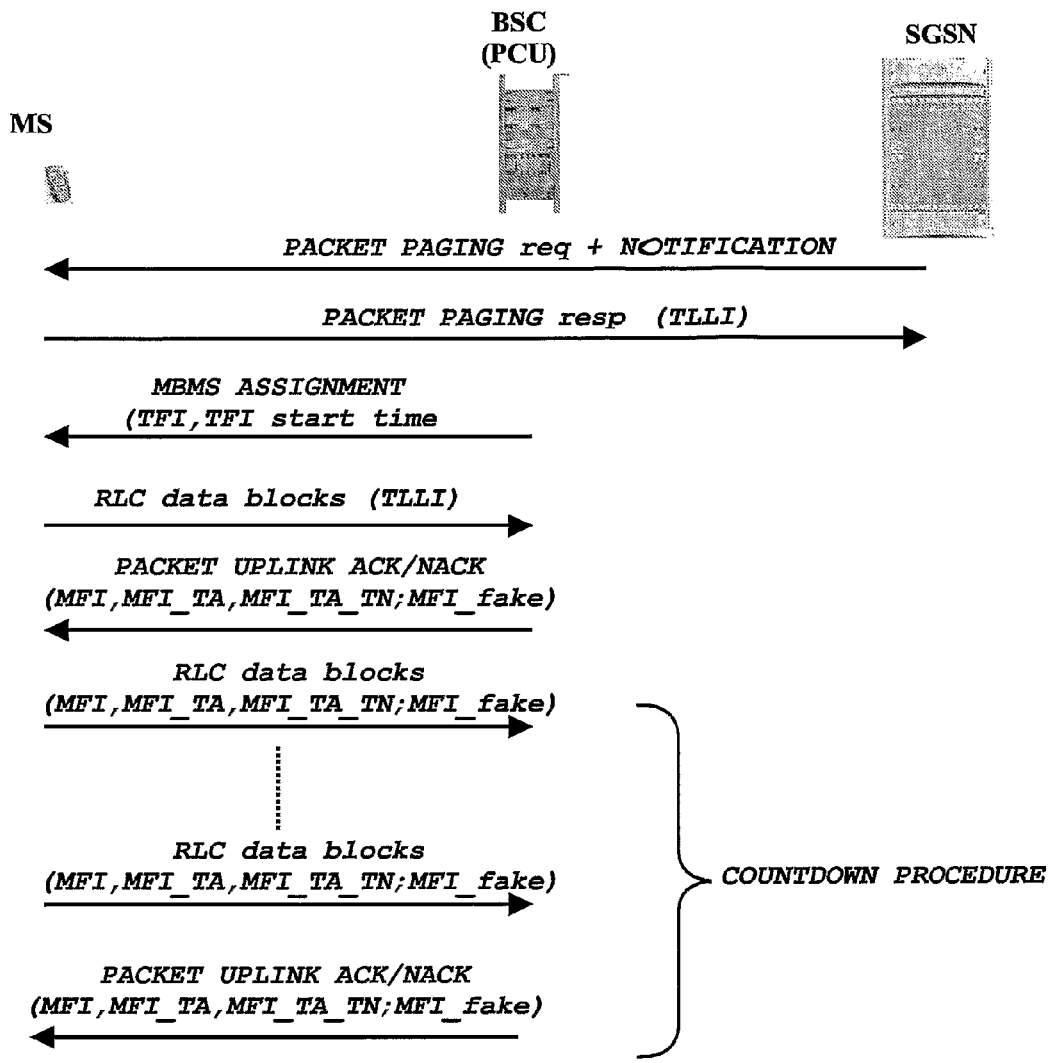
FIGS. 8A and 8B schematically show, in terms of exchanged messages, two alternative procedures for assigning resources to MSs when a multicast GPRS service starts to be delivered.

According to a first assignment procedure (FIG. 8A), when the multicast session (hereinafter, the MBMS session) for the service "A" is going to start, the generic SGSN, e.g. the SGSN SGSN1, sends an MBMS SESSION START request to the BSSs under its responsibility, such as that including the BSC BSC1, based on the cell/routing area information that the SGSN retrieves from the respective table 140-1. This event triggers a sequence of procedures at the radio level, that will be described in the following.

After the reception of the MBMS SESSION START request, for each MS involved in that MBMS session, a PACKET PAGING request is delivered by the BSC to the MSs.

As mentioned in the foregoing, when the MBMS session is going to start a generic MS can be in STAND-BY or in READY state; the READY state is further characterized by two modes, called PACKET IDLE and PACKET TRANSFER: in the PACKET TRANSFER mode, the MS is exchanging data traffic, while the PACKET IDLE mode is entered when the data traffic exchange terminates; after a prescribed time interval, the MS moves into the STAND-BY state.

As far as an MS in STAND-BY state or READY state and packet idle mode is concerned, the PACKET PAGING request is for example delivered on the Common Control CHannel (CCCH) (or, if available, on the Packet Common Control CHannel—PCCCH), and the PACKET PAGING request is followed by an MBMS NOTIFICATION message, including information related to the start of the requested MBMS service "A"; upon reception, the MS sends to the BSC a CHANNEL request, for example on the Random Access CHannel (RACH) (alternatively, if the PCCCH is available, the MS may send to the BSC a PACKET CHANNEL request on the Packet Random Access CHannel—PRACH), with paging response as an establishment cause. The BSC sends an IMMEDIATE ASSIGNMENT on the Access Grant CHannel (AGCH) (or, if PCCCH is available, a PACKET UPLINK ASSIGNMENT on Packet Access Grant CHannel—PAGCH). The MS is thus assigned a temporary PDCH; on the assigned temporary PDCH, the MS sends the PACKET PAGING response, including its respective TLLI. The BSS delivers the message including the TLLI to the competent SGSN.

Slightly differently, an MS in READY state and PACKET TRANSFER mode may already have an active downlink TBF or an active uplink TBF, or both. In this case, the MS can receive the PACKET PAGING request on, for example, the Packet Associated Control CHannel (PACCH), i.e. the dedicated control channel associated with the downlink PDCH assigned to the MS. The BSC also sends the MBMS NOTIFICATION message: if an uplink TBF is active, the MS sends the PACKET PAGING response, including the respective TLLI, which is delivered by the BSC to the SGSN. If an uplink TBF is not active, the MS can request a concurrent TBF within a first occurrence of a PACKET DOWNLINK ACK/NACK message related to the active service. The BSC sends a PACKET UPLINK ASSIGNMENT message or a PACKET TIMESLOT RECONFIGURE message to the MS on the PACCH, to assign a temporary PDCH. On the assigned temporary PDCH(s), the MS sends the PACKET PAGING response, including the respective TLLI, which is delivered by the BSC to the SGSN. The uplink TBF, already active in the former case or just established for delivering the PACKET PAGING response in the latter case, is kept alive by the MS, for example sending dummy RLC data blocks if necessary, until the MS receives an MBMS ASSIGNMENT message by the BSC.

The MBMS ASSIGNMENT message can be sent by the BSC on different channels, depending on the state of the MSs. In particular, the MBMS ASSIGNMENT message can be sent, for example, on the CCCH (or on the PCCCH, if available) for all the MSs in STAND-BY state or in READY state and in PACKET IDLE mode, while for each MS in READY state and in PACKET TRANSFER mode the MBMS ASSIGNMENT message can be sent, for example, on the PACCH.

By means of the MBMS ASSIGNMENT message, the BSC performs a resource allocation for allowing the MSs to exploit the MBMS service. In particular, the TFI and the downlink PDCH(s) related to the data transmission for the requested service "A" are included in the MBMS ASSIGNMENT message. Furthermore, a TBF starting time is also included in the MBMS ASSIGNMENT message, i.e. a parameter allowing the MSs determining the time delay between the resource allocation and the resource availability. In particular, the TBF starting time is set to a suitable value, sufficient for reasonably allowing the BSC to deliver the respective MFI parameter to the MSs, according to a procedure explained in the following, triggered by the MBMS ASSIGNMENT message itself.

The MBMS ASSIGNMENT message may in principle be sent once; however, according to an embodiment of the present invention, the MBMS ASSIGNMENT message is preferably sent more than once, particularly twice or more, more preferably five times, in order to overcome possible radio impairments leading to message loss on the MSs side (corresponding to a BLock Error Rate—BLER—equal to 80%).

To get the MFI, on reception of the MBMS ASSIGNMENT message, each MS involved in the specified MBMS session that entered in STAND-BY state or in READY state and in PACKET IDLE mode before the reception of the message, performs a one-phase access procedure on the CCCH (or on the PCCCH, if available), in order to get radio resources for a further uplink temporary TBF, e.g. via an IMMEDIATE ASSIGNMENT (PACKET UPLINK ASSIGNMENT if PCCCH is available). On the assigned temporary uplink TBF (which is characterized by a respective TFI, hereinafter referred to as UPLINK_TFI), the MS sends dummy RLC data blocks, with an extended RLC header including its TLLI, for contention resolution and identification purposes, and furthermore including the TMGI of the service "A"; the RLC header extension may be accomplished by setting predefined values in the LI field of the RLC header (in one of the octets 450a, . . . , 450n of the RLC data block), such as, for example, LI=56 in GPRS and LI=76 in EGPRS. The extended RLC header will therefore include Length Indicator(s)+TLLI+TMGI.

An MS, involved in the specified MBMS, which is in READY state and PACKET TRANSFER mode before the reception of the MBMS ASSIGNMENT message, on reception of such a message sends, on the already available uplink TBF (which is characterized by an UPLINK_TFI), and, RLC data blocks, possibly dummy, with the same extended RLC header as described above (including the MS's TLLI and the TMGI related to the service "A").

As soon as the BSC receives from one of the MS the first correct RLC data block including the UPLINK_TFI plus the TLLI plus the TMGI, the BSC sends a PACKET UPLINK ACK/NACK message to that MS, addressing it via the UPLINK_TFI and a content-resolution TLLI (i.e., a TLLI selected by the BSC from all those received, according to a contention resolution procedure), further including in the message the TMGI received from the MS. With this message, the BSC communicates the assigned MFI to the MS. According to an embodiment of the present invention, together with the MFI, additional parameters used for synchronizing the radio transmission are sent with this message, for example a Timing Advance Index (TAI) and a Timing Advance Timeslot Number (TA_TN), used for allowing the MS to perform a Timing Advance (TA) procedure. Such additional parameters are individually assigned by the BSC to that specific MS, and for this reason will be referred to as MFI_TAI and MFI_T-A_TN.

Without entering into excessive details, known per-se, the TA procedure is a procedure by means of which the BSC gets information about the distance of a generic MS from the BTS, and thus of the propagation delay of the radio signal from the BTS to the MS, and communicates to the MS information adapted to let the MS synchronize with the transmission. The TAI is an index assigned by the BSC to the MS, while the TA_TN is a parameter specifying which timeslot carries the synchronization information; when the MS recognizes its own TAI in a received data block, it looks at the timeslot specified by the TA_TN parameter and gets the TA synchronization parameter.

The fields that are sent by the BSC to the MS via the PACKET UPLINK ACK/NACK message, i.e. the TMGI, the MFI, the MFI_TAI, and the MFI_TA_TN are for example included in the message using padding bits.

Once the MS has received from the BSC the PACKET UPLINK ACK/NACK message including the triplet {MFI, MFI_TAI, MFI_TA_TN}, the MS starts a countdown procedure, at the end of which the temporary uplink TBF is released. The countdown procedure is directed to acknowledge the BSC about the correct reception of the triplet {MFI, MFI_TAI, MFI_TA_TN} by the MS, and, correspondingly, to make the MS aware of the fact that the BSC has acknowledged such correct reception. Roughly speaking, the countdown procedure may involve, from the MS side, sending to the BSC, for a prescribed number of times, e.g. 10 times, data blocks including the same parameters received from the BSC, i.e. the triplet {MFI, MFI_TAI, MFI_TA_TN}, which are interpreted by the BSC as a confirmation of the reception, and looking for a counter-reply from the BSC.

In greater detail, the parameters sent from the MS to the BSC may be included in extension fields of the RLC data block header, the extension being accomplished setting the field LI in one of the octets 450a, . . . , 450n to a first predefined value (for example, LI=55 for GPRS; LI=75 for EGPRS) for including the MFI, and setting the field LI in another octet to another predefined value (for example, LI=59 for GPRS and LI=79 for EGPRS) for including the MFI_TAI and the MFI_TA_TN). If the BSC does not receive at least one of these RLC data blocks including the assigned {MFI, MFI_TAI, MFI_TA_TN} from the MS within a prescribed time interval, the BSC sends again the PACKET UPLINK ACK/NACK message to the MS, with the same fields included in the first transmission, i.e. the BSC re-sends the triplet of parameters {MFI, MFI_TAI, MFI_TA_TN}.

Once the uplink TBF has been released, both the MS and the BSC store the triplet {MFI, MFI_TAI, MFI_TA_TN} to be used by that MS and by the BSC during the MBMS session. In particular, the BSC stores, for each MS, the triplet {MFI, MFI_TAI, MFI_TA_TN} in a table (identified as 145-1 for the BSC BSC1, and 145-2 for the BSC BSC2 in FIG. 1), in association with the TLLI of that MS.

The procedure described above is repeated for all the MSs involved in a specified service, e.g. the service "A". With such procedure, the BSC becomes aware of the number of MSs involved in the reception of the service "A", and may address information to such MSs, exploiting the MFI identifier. For example, efficient ack/nack procedures may be set by the BSC.

It is observed that, in practice, the values available for the parameter MFI are limited: for example, if the parameter MFI is represented by a five-bit digital code, thirty-two values are available. In preferred embodiments, the procedure described above may be repeated until the last but one valid MFI value is available on the BSC side. Then, the last available MFI value is assigned to all the remaining MSs as a default, fake MFI (hereinafter MFI_fake), in the PACKET UPLINK ACK/NACK message sent by the BSC to each of these MSs; however, differently from the messages sent to the previous MSs, within these messages the fields MFI_TAI and the MFI_TA_TN are not included.

It is observed that the list of MSs which are addressed by the BSC does not necessarily remain the same for the whole MBMS session, and it can be modified during the MBMS session, with exits of some or all of the MSs previously present and entries of new MSs, for example chosen from the pool of MSs counted by the BSS and to which the MFI_fake was assigned. If, during the MBMS session, a triplet {MFI, MFI_TAI, MFI_TA_TN} is freed and becomes available on the BSC side for a new MS, the default parameter MFI_fake and the respective TLLI may be used by the BSC to address a specific MS, in order to assign thereto the available triplet {MFI, MFI_TAI, MFI_TA_TN}.

Similarly to the previous MSs, once each MS exceeding the last but one valid MFI value available on the BSC side has received the PACKET UPLINK ACK/NACK message including the parameter MFI_fake, it start the countdown procedure at the end of which the uplink TBF is released. The countdown procedure is accomplished as described in the foregoing: the MS includes the MFI_fake in all the following RLC data blocks sent to the BSC by way of reception confirmation, in order to notify the BSS of the correct reception of this field. The extension of the RLC data block header can be for example accomplished setting, in one of the RLC header octets, a predefined value, such as for example LI=57 for GPRS and LI=77 for EGPRS. If the BSC does not receive at least one RLC data block including the assigned default MFI_fake from the MS within a prescribed time limit, the BSC sends again the PACKET UPLINK ACK/NACK message to the MS, with the same fields included in the case of the first transmission.

Once the uplink TBF has been released, both the MS and the BSC store the MFI_fake. The BSC stores the MFI_fake in the respective table 145-1 or 145-2, in association with the TLLI of that MS.

If a generic MS (with "real" MFI or with MFI_fake) does not succeed in releasing the uplink TBF before the MBMS session TBF starting time (i.e., before the MBMS resources become available), that MS switches anyway to the assigned PDCH(s) for the multicast service at the time specified by the TBF starting time.

According to an embodiment of the present invention, the procedure hereinafter described is followed.

For example, the uplink TBF couldn't be released because the MS did not received the expected PACKET UPLINK ACK/NACK messages from the BSC before the TBF starting time, so that such MS did not receive a respective triplet {MFI, MFI_TAI, MFI_TA_TN}. In such case, if the MS succeeded in sending at least one RLC data block including the respective TLLI and the TMGI to the BSC, the MS assumes, by default, the MFI_fake. On the other hand, if the BSC has received from that MS at least one RLC data block including the TLLI and the TMGI, the BSC associates (in the table 145-1, or 145-2), by default the MFI_fake to the TLLI of that MS, regardless of the fact that the BSS succeeded or not in sending a PACKET UPLINK ACK/NACK message to that MS and, in case it succeeded, regardless of the fact that the PACKET UPLINK ACK/NACK message included the triplet {MFI, MFI_TAI, MFI_TA_TN} or the default MFI_fake. In the other cases the BSC is not aware of this MS involved in the multicast service.

Differently, if the MS has received from the BSC a PACKET UPLINK ACK/NACK message including the triplet {MFI, MFI_TAI, MFI_TA_TN} or the default MFI_fake before the TBF starting time, but the countdown procedure didn't complete properly, the MS anyway stores the MFI_fake, regardless of the fact that it succeeded or not in sending to the BSC at least one following RLC data block including the received triplet {MFI, MFI_TAI, MFI_TA_TN} or the default MFI_fake, respectively. On the other hand, the BSC associates (in the respective table 145-1 or 145-2) the default MFI_fake to the TLLI of that MS.

Exemplarily, FIG. 1 shows the table 145-1 held by the BSC BSC1, including the radio parameters of the downlink radio connections for the MSs MS1 and MS2, in particular, the TFI identifying the radio data blocks through which the (E)GPRS multicast service is multicast in downlink through the cell CELL1, and, for each MS, the TLLI, in addition to further parameters, particularly the MFI for that MS, preferably the triplet {MFI, MFI_TAI, MFI TA_TN}, or the MFI_fake.

For the sake of completeness, it has to be observed that if an MS involved in the multicast service was not able to establish an uplink TBF after the reception of the MBMS ASSIGNMENT message from the BSC and before the TBF starting time, the MS may anyway switch to the assigned PDCH(s) for the multicast service at the time specified by the TBF starting time. In such case, such an MS does not have a triplet {MFI, MFI_TAI, MFI_TA_TN}, nor the default MFI_fake. Moreover, the BSC is not aware of this MS involved in the multicast service. However, such an MS may anyway enjoy the multicast service.

In the MFI assignment procedure described above, the MFI (and the other parameters for TA update) are communicated by the BSC to the MSs on request of the latter ones, which, after receiving the MBMS ASSIGNMENT message from the BSC, have to send to the BSC a request message before the data traffic related to the multicast service starts to be delivered. Also, the BSC is substantially transparent to the initial PACKET PAGING response from the MSs, which is directed to the competent SGSN.

Figure 8B:
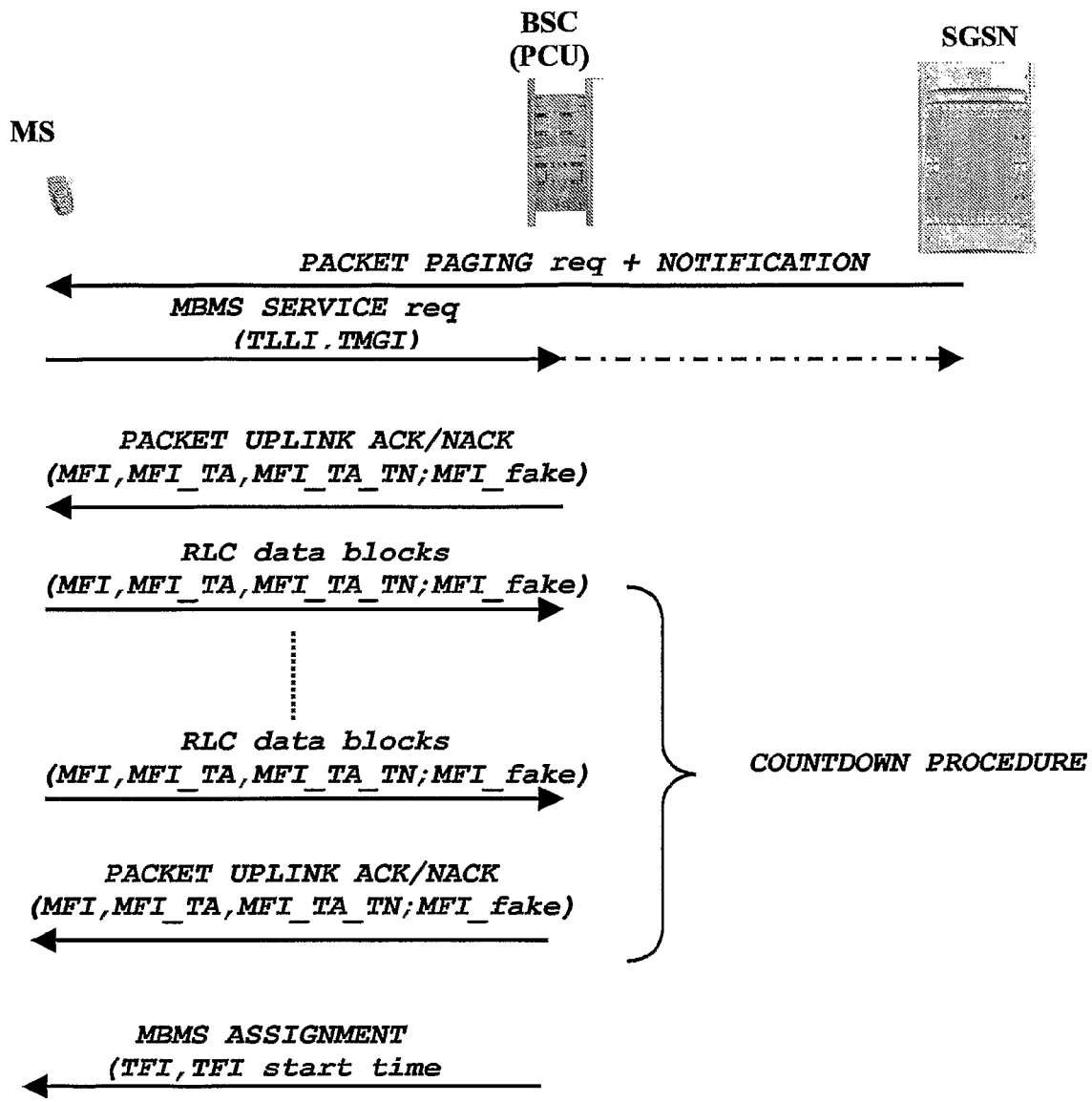

An alternative MFI assignment procedure, in which the response to the PAGING is directly captured by the BSC, may be the following (FIG. 8B).

When the multicast session is going to start, the PACKET PAGING request to the MSs is triggered by the SGSN to the BSC(s). As far as an MS in STAND-BY state or in READY state and PACKET IDLE mode is concerned, on reception of the PACKET PAGING request, for example on the CCCH (or on the PCCCH if available), and of the MBMS NOTIFICATION message, that MS sends a CHANNEL Request on the RACH (or a PACKET CHANNEL request on the PRACH, if the PCCCH is available). The BSC sends an IMMEDIATE ASSIGNMENT on the AGCH (or a PACKET UPLINK ASSIGNMENT on the PAGCH, if the PCCCH is available). On the assigned temporary PDCH, the MS sends to the BSC a MBMS SERVICE request including in the message the respective TLLI and the TMGI identifying the multicast group. The temporary uplink TBF established for delivering the MBMS SERVICE request is kept alive by the MS, sending dummy RLC data blocks if necessary, until the MS receives from the BSC a PACKET UPLINK ACK/NACK message including the MFI, preferably the triplet {MFI, MFI_TAI, MFI_TA_TN}, or the MFI_fake, assigned by the BSC to that specific MS.

As far as an MS in READY state and PACKET TRANSFER mode is concerned, such an MS may already have an active downlink TBF or an active uplink TBF or both. The MS may receive the PACKET PAGING request on the downlink PACCH (the downlink packet control channel associated with the downlink PDCH of that MS). The BSC also sends the MBMS NOTIFICATION message. If an uplink TBF is already active, the MS sends the MBMS SERVICE request, including its TLLI and the TMGI, to the BSC. In the negative case, the MS can request a concurrent TBF within a first occurrence of a PACKET DOWNLINK ACK/NACK message related to the active service; the BSC sends a PACKET UPLINK ASSIGNMENT or a PACKET TIMESLOT RECONFIGURE to the MS on the PACCH; on the assigned PDCH(s) the MS sends the MBMS SERVICE request, including its TLLI and the TMGI, to the BSC. The uplink TBF, already active in the former case or just established for delivering the MBMS SERVICE request in the latter case, is kept alive by the MS, sending dummy RLC data blocks if necessary, until the MS receives a PACKET UPLINK ACK/NACK message including the triplet {MFI, MFI_TAI, MFI_TA_TN}, or the MFI_fake, assigned by the BSC to that specific MS.

As soon as the BSC receives the MBMS SERVICE request from an MS, the BSC sends a PACKET UPLINK ACK/NACK to that MS, addressing it via the respective UPLINK_TFI and the contention-resolution TLLI, and including the TMGI received from the MS, as well as the triplet {MFI, MFI_TAI, MFI_TA_TN} assigned by the BSS to that specific MS; these four additional fields (TMGI, MFI, MFI_TAI, MFI_TA_TN) may be included, for example, using padding bits inside the PACKET UPLINK ACK/NACK message.

Once the MS has received the PACKET UPLINK ACK/NACK message including the triplet {MFI, MFI_TAI, MFI_TA_TN}, it starts the countdown procedure in order to release the uplink TBF. This is carried out as described in detail with reference to FIG. 8A.

The above procedure is repeated for all the MSs involved in a specified multicast service, and at most until the last but one valid MFI value is available on the BSC side. If more MSs are involved, within a single cell, in the specified MBMS, the last available MFI value is assigned to all these MSs as a default MFI_fake in the PACKET UPLINK ACK/NACK message sent to each of these MSs; these PACKET UPLINK ACK/NACK messages do not include the MFI_TAI and the MFI_TA_TN fields. A similar countdown procedure is started by each MS that has received the MFI_fake.

The BSC then sends the MBMS ASSIGNMENT message, including the TFI, the PDCH(s) and the TBF starting time of the service "A", for example on the CCCH (or on the PCCCH if available), for all the MSs in STANDBY state or in READY state and in PACKET IDLE mode, or on the PACCH for each MS in READY state and in PACKET TRANSFER mode. As explained before, the MBMS ASSIGNMENT message may be preferably sent more than once, for example for five times, in order to overcome potential radio impairments leading to message loss on the MSs side.

If the uplink TBF used for delivering the MBMS SERVICE request is not released before the TBF starting time included in the MBMS ASSIGNMENT message, the MS anyway switches to the assigned PDCH(s) for the multicast service at the time specified by the TBF starting time. A procedure similar to that described with reference to FIG. 8A may be followed.

It can be appreciated that in this alternative MFI assignment procedure, the MSs reply to the paging request by a MBMS SERVICE request, to which the BSC automatically replies communicating the MFI (and, preferably, the additional parameters MFI_TAI and MFI_TA_TN) to the MSs; this is done before the assignment of the resources for the multicast service. The MBMS SERVICE request stops at the BSC, so that the BSC may directly perform the count of the MSs involved in the multicast service "A". On the other hand, the SGSN is in this case not aware of which MSs of the multicast service group are at a given time actually exploiting the service.

As a further alternative (FIG. 8B, dash-and-dot line), once an MS has sent the MBMS SERVICE request, including its TLLI and the TMGI, to the BSC, the BSC additionally delivers the MBMS SERVICE request the competent SGSN, which is thus made aware of which MSs are exploiting the service.

Any one of the above described procedures allows the BSC to perform both the counting and the individual addressing of the MSs involved in a specified multicast service, e.g. the service "A" (characterized by a TMGI TMGI-A). Thus, the BSC is aware of the number of users involved in the multicast service, and can selectively update the timing advance for the different MSs, in addition to implementing effective retransmissions policies. During the MBMS session, the MFI assigned and communicated to a given MS is used by the BSC to address information to that MS; similarly, the MS uses the MFI assigned and communicated thereto for allowing the BSC recognizing that MS among all the MSs involved in that MBMS session. During the MBMS session, the MFI_TAI and the MFI_TA_TN are used by the MS and by the BSC for the continuous TA update procedure. The TN specified by MFI_TA_TN identifies one PDCH belonging to the set of PDCHs allocated for that MBMS session. It is noticed that up to sixteen MSs may be addressed on the same PDCH, since up to sixteen MSs may adjust the TA on the same PDCH via MFI_TAI, with a standard continuous TA update procedure.

Concerning the users to which the default MFI_fake has been assigned, the BSC can count the exceeding MSs, even if it can not individually address them, either for the retransmissions management or for TA update. However, even the mere counting of such MSs may be of help in order to correctly tune retransmission policies in an ack/nack procedure. For example, if continuous retransmission of radio data blocks is needed from an MS to which a "real" MFI value has been assigned, the BSC may recognize that the reception quality of such MS is very poor. For example, the MS may be located on the border of the cell, a fact that may be also checked from the values of the additional parameters MFI_TAI and MFI_TA_TN. Thus, the BSC may decide to "free" the already assigned MFI, e.g. by assigning to such MS the MFI_fake, and to assign the available MFI value to one of the MSs to which the MFI_fake was previously assigned (by addressing this MS using its TLLI), in order to gain efficiency of the retransmission policy.

The provision of the parameter MFI in addition to the TFI gives rise to a global address parameter, or global identifier {TFI,MFI}, that allows the network apparatuses, namely the generic BSC, to address a specific MS among those involved in the multicast service "A" inside a specific network cell.

The possibility of individually addressing the MSs in a cell even if they belong to a same multicast group opens the way to several different exploitations, and in particular enables the network to implement an efficient multicast data retransmission policy based on the ACKnowledgment/uNACKnowledgement (ACK/NACK) of the received data by the MSs.

Figure 5:
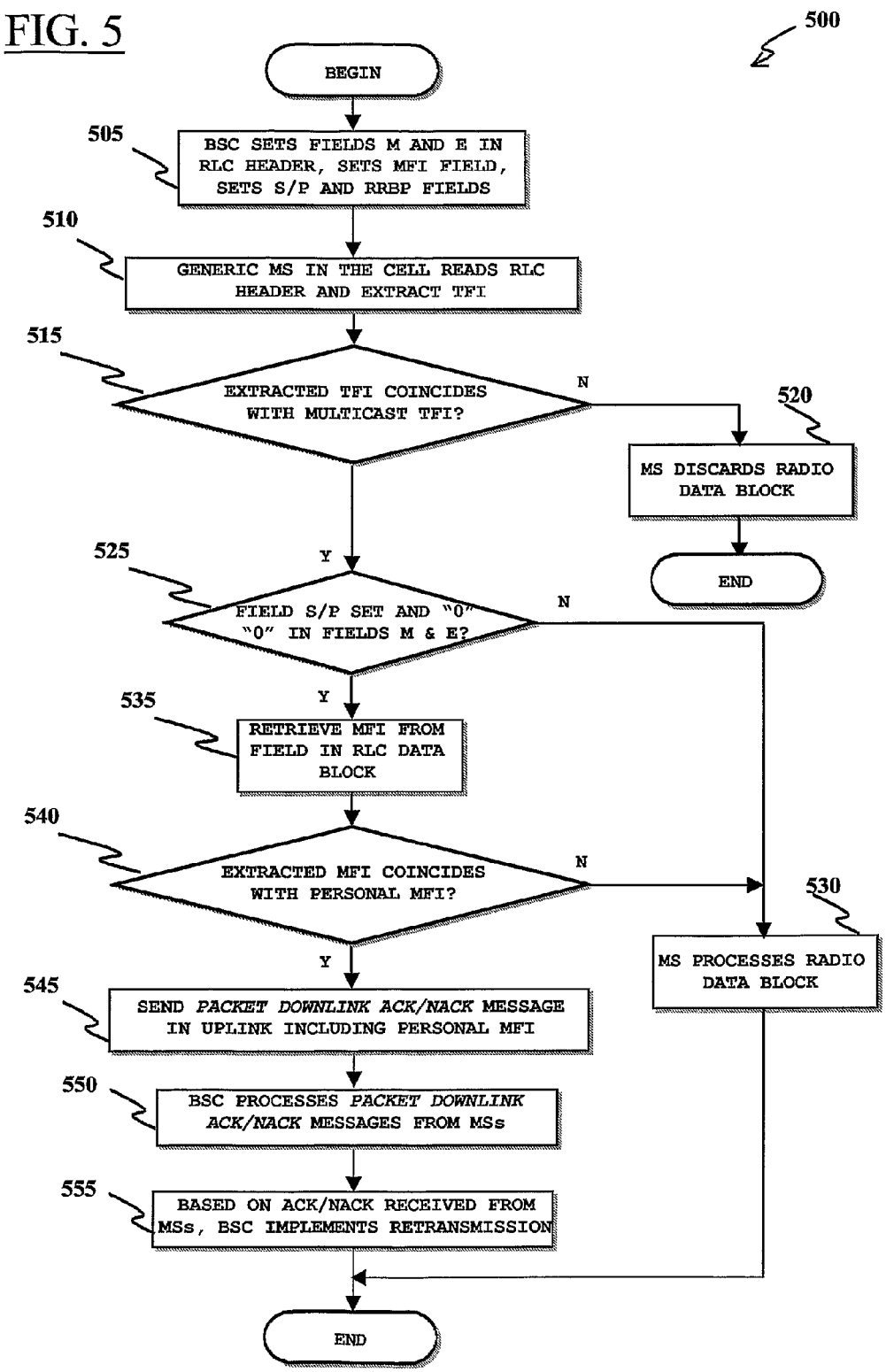
FIG. 5 is a schematic flowchart illustrating a MS-selective data receipt acknoweldge/unacknowledge scheme according to an embodiment of the present invention.

An ACK/NACK-based retransmission policy according to an embodiment of the present invention will now be explained in detail, with the aid of the schematic flowchart of FIG. 5.

Figure 6:
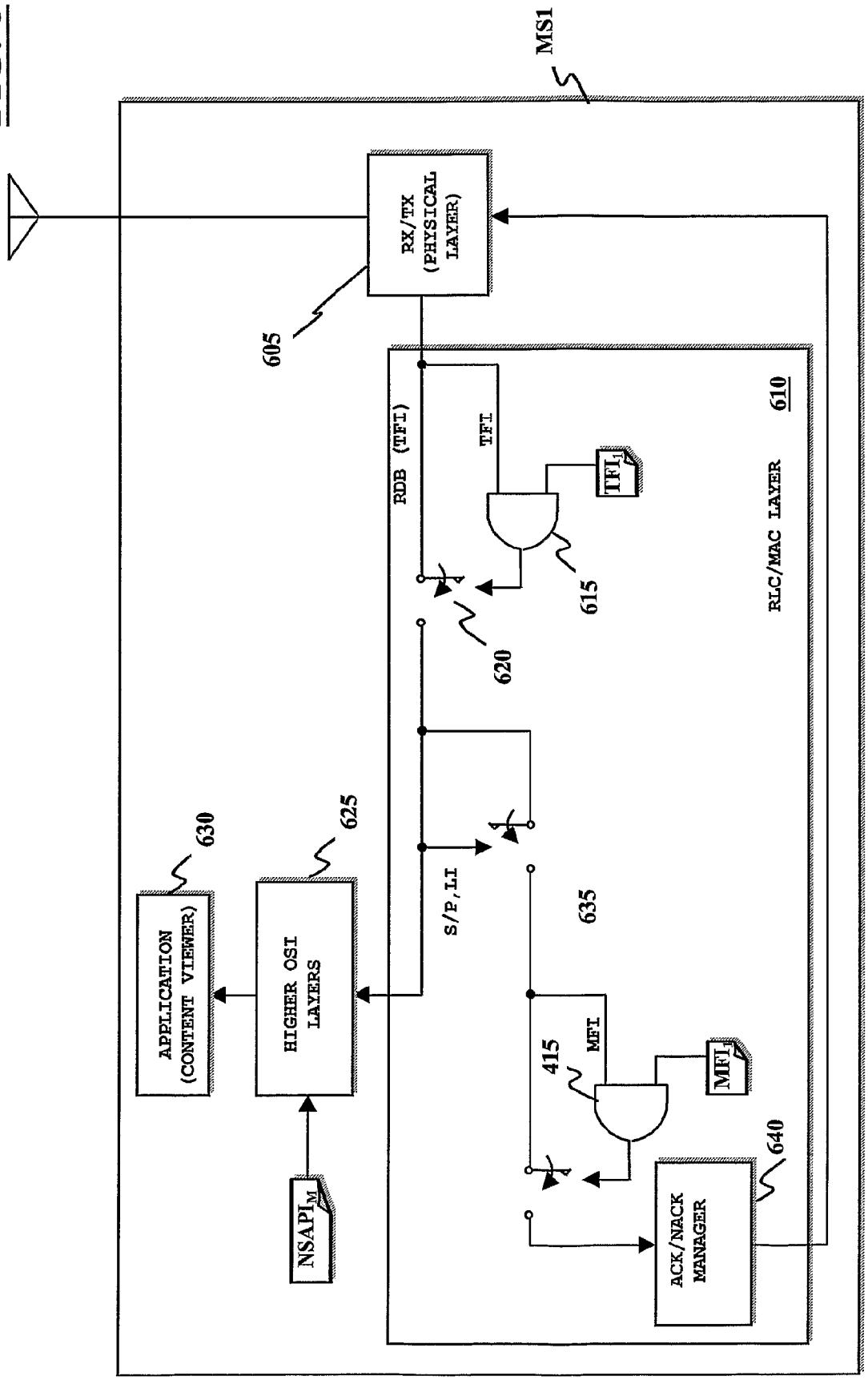
FIG. 6 schematically shows, in terms of functional blocks relevant to the understanding of the exemplary invention embodiment herein considered, a mobile station adapted to exploit a multicast GPRS service.

In order to better understand the ACK/NACK-based retransmission policy, reference is made to FIG. 6, schematically showing, in an extremely simplified way and in terms of functional blocks relevant to the understanding of the exemplary invention embodiment herein considered, a generic MS such as the MS MS1. As known, an MS comprises, in addition to specific elements allowing radio communications, a programmable data processing unit, particularly a microprocessor, with dynamic and non-volatile memory resources, and strictly interacting with a Subscriber Identity Module (SIM), which is a removable smart-card module having its own data processing and storage capabilities. It is intended that at least some of the functions that will be described are implemented in terms of software run by the data processing units of the MS and/or of the SIM.

The MS MS1 comprises a physical layer unit 605 handling the low-level (physical level) details of the radio communications, compliant to the GSM standard; this unit comprises in particular the transmitter/receiver circuits of the MS.

The physical level unit 605 communicates with an RLC/MAC (Media Access Control) level unit 610, managing the communications at the immediately higher RLC/MAC level of the ISO OSI model, particularly controlling the access of the MS to the physical communication medium. In extremely simplified terms, sufficient for the purposes of the present description, the RLC/MAC level unit 610 receives the radio data blocks from physical level unit 605, and reconstructs the various GPRS logic channels mentioned in the foregoing. In particular, the RLC/MAC level unit compares (as schematized by the AND logic gate 615) the TFI labeling the received radio data blocks to the locally-stored tuning TFI $TFI_1$, which the MS uses for establishing whether the radio data blocks are directed thereto, and are therefore to be captured and retained, or discarded. If the TFI labeling the received radio data blocks does not coincide with the tuning TFI $TFI_1$, the radio data blocks are discarded (as schematized by the switch 620 open), otherwise they are captured, the data traffic channel is reconstructed, and the data are passed over to the higher levels of the OSI model 625, up to the OSI application layer.

The received data relating to the GPRS service are then passed to an application software 630, such as a content viewer or an MP3 player or the like and, through the proper I/O peripheral (display, loudspeaker, headphones), are made available to the user (alternatively, or in combination, the data may be stored in a local storage of the MS, for a background fruition).

As schematized by a switch 635, depending on whether or not the field S/P 435 in the received radio data block is set, and the LI field 455 (or 455a) in one of the octets $450a, \ldots, 450n$ is set to one of the predetermined values, the MFI is extracted from the received radio data block, and compared (as schematized by the AND logic gate 640) to a locally-stored, personal MFI $MFI_1$, received from the BSC e.g. through one of the assignment procedures described above. In case of coincidence, an ACK/NACK manager 640 manages the ACK/NACK operations.

Back to the flowchart 500, at the start of the MBMS session the network apparatuses assign to each MS (belonging to a multicast service group) a respective MFI, as described in the foregoing, univocally identifying the MS. The generic MS thus knows which is the respective MFI that the network (namely, the BSC) has univocally assigned thereto.

Let it now be assumed that the generic BSC of the network, for example the BSC BSC1, wants to address a specific one of the MSs under its responsibility, which are located in a same cell and are at the time receiving a same multicast service, in the example one among the MSs MS1 and MS2 in the cell CELL1, e.g. the MS MS2, in respect of the service "A".

The BSC BSC1 sets the LI field 455a in one of the octets 450a, . . . , 450n within the RLC header 410 of a generic RLC/MAC block 400, sent on the downlink to the predetermined value, e.g. 75), and sets the field MFI 470 with the desired MFI, corresponding to the MS to be addressed, retrieved from the table 145-1.

Such a block 400 may for example be one of the radio data blocks delivering the data relating to the multicast service "A".

Additionally, the BSC BSC1 sets the S/P field 435 and RRBP field 430 within the MAC header 405 of that RLC/MAC block 400.

All these operations are schematized by action block 505 in the flowchart 500.

In this way, the network apparatuses address the specific MS MS2, via the respective global identifier {TFI,MFI} in the radio data block RLC header 415, and instruct the addressed MS MS2 to send a PACKET DOWNLINK ACK/NACK message on the uplink to the BSC BSC1, at a time specified in the RRBP field 430.

It is observed that the network ACK/NACK request period shall be properly selected, in order to avoid stall conditions of the transmit window on the BSC side. In particular, the request period depends on GPRS or EGPRS use, the number of PDCHs allocated to the MBMS session, the window size in case of EGPRS, the number of MSs involved in the MBMS session, the BS_CV_MAX and the RRBP values. With an appropriate selection of the parameters, it is possible to receive the PACKET DOWNLINK ACK/NACK message from the maximum number of MSs which can be multiplexed on a PDCH and controlled via the continuous TA update procedure, i.e. 16, still avoiding a stall condition of the transmit window on the BSS side. In such a way, all the MSs having been assigned a respective triplet {MFI, MFI_TAI, MFI_TA_TN} can periodically send the PACKET DOWNLINK ACK/NACK message.

Back to the flowchart 500, the generic MS in the cell CELL1 reads the RLC header 410 of the radio data block 400 transmitted in the downlink, and extracts the TFI (block 510).

The generic MS then checks whether the extracted TFI coincides with the one previously communicated thereto by the BSC (decision block 515).

In the negative case (exit branch N of decision block 515), the MS discards the radio data block (block 520).

In the affirmative case (exit branch Y of decision block 515) the MS checks (decision block 525) whether the S/P field 435 in the MAC header 405 is set, and the LI fields are set to the predetermined values (LI=55 for GPRS or LI=75 for EGPRS), indicating that the network is addressing a specific MS to request an ACK/NACK therefrom. In the negative case (exit branch N of decision block 525), the MS processes the received radio data block as usual, particularly for retrieving the RLC data (block 530). In the affirmative case (exit branch Y of decision block 525), the MS reads the field MFI 470 (the presence of which is signaled to the MS by the fact that the fields LI in the RLC header store the predetermined value 55 (GPRS) or 75(EGPRS)), to retrieve the MFI value stored therein (block 535).

The MS then checks whether the retrieved MFI coincides with the stored MFI, previously communicated to the MS by the BSC (decision block 540). In the negative case, the MS processes the received radio data block as usual (block 530), otherwise (exit branch Y of decision block 540) the MS understands that it has been addressed by the network and requested to perform an ACK/NACK of the received data.

The MS MS2 addressed via the global identifier {TFI, MFI} in the way described above sends the PACKET DOWNLINK ACK/NACK message in the uplink radio block period specified by the value in the RRBP field 430 (block 545). The MS may include its MFI in the PACKET DOWNLINK ACK/NACK message using part of the padding bits of the message, in order to let the BSC detect the correct identity of the responding MS. For example, the PACKET DOWNLINK ACK/NACK message may be sent to the BSC on the uplink PACCH, common to all the MSs involved in the MBMS session, which is the associated control channel associated with the downlink PDCH(s) used to deliver the multicast service to the MSs.

Without entering into details well known to the specialists, the PACKET DOWNLINK ACK/NACK message has a standard format and a predefined length (typically, 160 bit) and, among the other fields, includes the TFI of the sender MS, and an ACK/NACK description comprising a map of the received data blocks (the so-called Received Block Bitmap—RBB) useful to provide the BSC with an indication on the correct reception of the data blocks in a transmit window.

Figure 7:
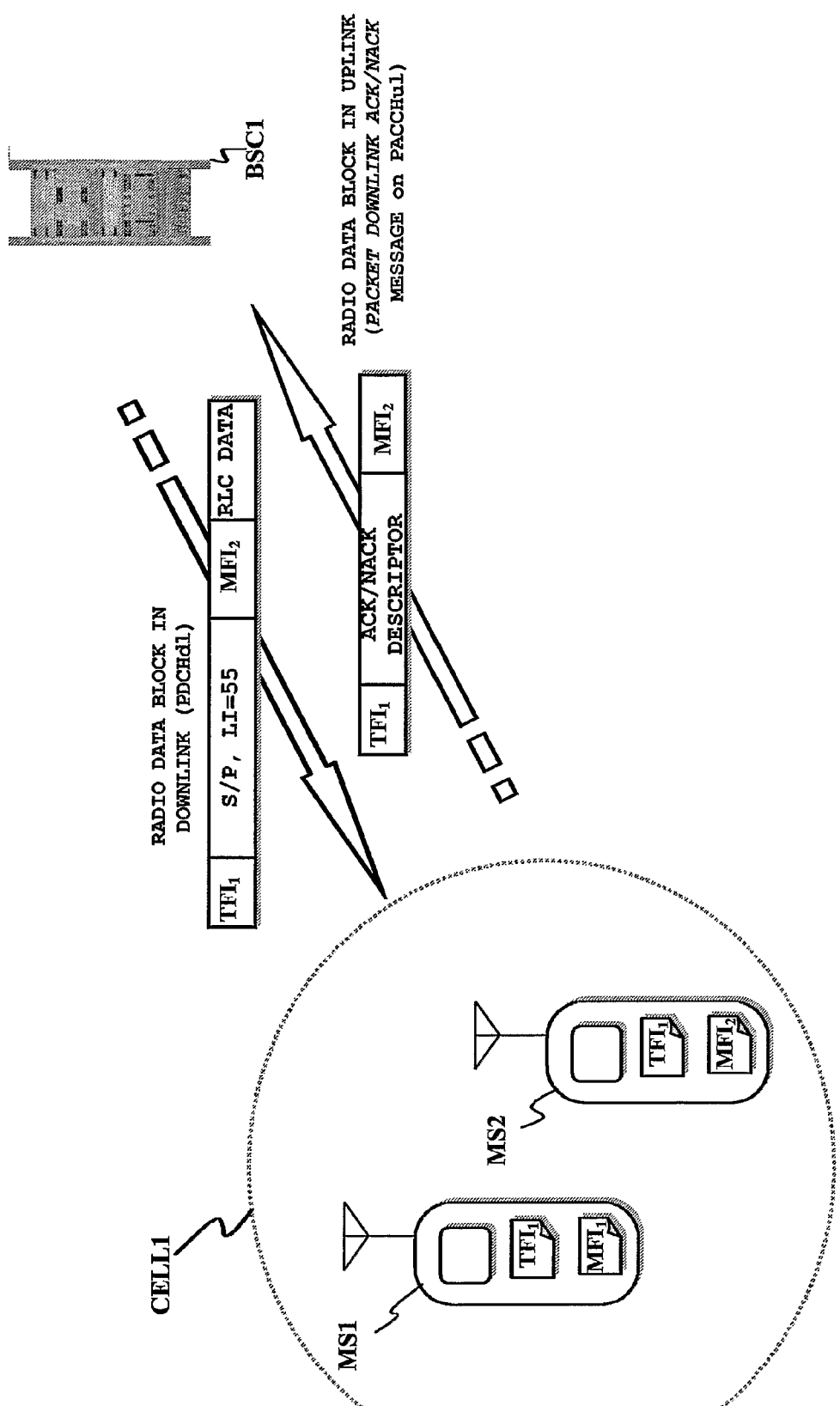
FIG. 7 is a pictorial representation of the MS-selective data receipt acknoweldge/unacknowledge scheme depicted in FIG. 5.

The MS MS2 includes the personal MFI $MFI_2$ in the PACKET DOWNLINK ACK/NACK message; in this way, when the BSC BSC1 receives the message, it is capable (referring to the table 145-1) to assess the correct identity of the responding MS MS2 among those of the multicast group within the same cell CELL1, sharing the same TFI $TFI_1$. In particular, part of the so-called padding bits normally provided in the message (for achieving the predetermined message length of 160 bits) are exploited to include the MFI in the PACKET DOWNLINK ACK/NACK message (as schematically depicted in FIG. 7).

The BSC BSC1 processes (block 550) all the PACKET DOWNLINK ACK/NACK messages received within a request period from all the MSs involved in a specific multicast service, and with an assigned individual triplet {MFI, MFI_TAI, MFI_TA_TN}, in the example the MSs MS1 and MS2 as far as cell CELL1 is concerned, in respect of service "A" (a similar polling is performed on the MSs of other cells under the responsibility of the BSC).

Based on the ACK/NACK messages received from the MSs, the BSC implements a retransmission policy of the data relating to the multicast service "A" to the MSs (block 555).

Several retransmission policies can be implemented at the BSC level, the specific nature of the retransmission policy being per-se not limitative of the present invention.

In particular, and just by way of example, two types of retransmission policies are feasible, defined exhaustive and selective, respectively.

In the exhaustive retransmission policy, all the radio data blocks referred to as not acknowledged (shortly, nacked) in the RBB of the ACK/NACK description in any received PACKET DOWNLINK ACK/NACK message are retransmitted. In such a case, the delay due to the retransmissions could be remarkable; it is therefore necessary to correctly evaluate the buffer size of the application software 630 resident in the MS and allowing the user to exploit the received service (e.g. a TV viewer, and/or music multimedia player), in order to avoid/minimize potential service interruptions.

The procedures at the RLC level on the network side needs to be modified, compared to standard procedures, in order to periodically set the start of the transmit window corresponding to the least recent radio block not yet positively acknowledged among all the received PACKET DOWNLINK ACK/NACK messages, and not on a single PACKET DOWNLINK ACK/NACK message basis.

In the selective retransmission approach, the retransmission may be based on the overall number of nacked radio data blocks, on a threshold relevant to the percentage of MSs requesting the retransmission of a specific radio data block, and, possibly, on the MFIs of the MSs requesting the retransmissions (for example, in order to take into account for MSs possible located in areas of a cell of scarce coverage).

The impact on procedures at the RLC level within the MSs is higher than in the previously discussed case. In particular, in order to support such a retransmission scheme, the generic MS shall be capable of advancing the receive window even if that MS did not correctly receive the least recent radio block not yet received within a specified timeout; for example, the missing radio blocks should be replaced by all-zero fill bits payload radio blocks. The same impact applies also for all the MSs which are not included in the list of the individually addressable MSs, i.e. those which are not allowed to send PACKET DOWNLINK ACK/NACK messages (the MSs with the default MFI_fake assigned to all the MSs in excess of an upper limit, and the MSs the BSS is not aware of). For those MSs the same impact occurs also with an exhaustive algorithm (since the algorithm is exhaustive just for the addressed MSs). On the network side, the RLC-level procedures shall also be modified in order to periodically set the start of the transmit window corresponding to the least recent radio block not yet positively acknowledged that the BSC decides to take into account for retransmissions, based on the selective algorithm.

Furthermore, the BSC may decide that an MS is no more to be taken into consideration for the retransmissions management; for example, the BSC may decide this based on the ACK/NACKs received from that MS, as previously explained. In this case, the BSC removes the MS from the list of the individually addressable MSs, for example changing the MS identifier from MFI to MFI_fake. To do this, the BSC for example identifies the MS by including the respective MFI in a RLC/MAC block, the RLC header of which is further extended to include the MFI_fake. The RLC header extension for including the MFI_fake may be performed setting the LI field in one of the octets 450$a$, . . . , 450$n$ to a predetermined value, e.g. LI=57 (following the LI=55 indicating the inclusion of the MFI) in GPRS and LI=77 (following the LI=75 indicating the inclusion of the MFI) in EGPRS. The extended RLC header includes therefore Length Indicators+MFI+MFI_fake.

When the MS detects that its identifier has been changed from MFI to MFI_fake, the MS releases the MFI_TAI and MFI_TA_TN values, which become no more available any more for that MS.

The BSC further associates the MFI_fake to the TLLI of that MS in the table 145-1 (or 145-2); the triplet {MFI, MFI_TAI, MFI_TA_TN} previously assigned to that MS is now available on the BSC side for a new MS.

The MS removed from the list is from then on no more allowed to send PACKET DOWNLINK ACK/NACK messages in uplink, even in case the S/P and RRBP fields are set within the MAC header of the current RLC/MAC block.

When a triplet {MFI, MFI_TAI, MFI_TA_TN} becomes available on the BSC side for a new MS, the BSC chooses, e.g. randomly, an MS characterized by its TLLI and with MFI_fake as a new entry in the list of the individually addressable MSs: the BSC identifies this MS with these two parameters in an RLC/MAC block, and changes the MS identifier from MFI_fake to MFI, adding the parameters MFI_TAI and MFI_TA_TN in the same RLC/MAC block. In order to achieve this, the MFI may be included by setting LI=55 for GPRS and LI=75 for EGPRS; the MFI_fake may be included by setting LI=57 for GPRS and LI=77 for EGPRS; the TLLI may be included by setting LI=58 for GPRS and LI=78 for EGPRS; the MFI_TAI and the MFI_TA_TN may be included by setting LI=59 for GPRS and LI=79 for EGPRS. The extended RLC header includes therefore Length Indicators plus MFI plus MFI_fake plus TLLI plus MFI_TAI plus MFI_TA_TN.

When the MS, receiving the RLC/MAC block, detects that its identifier has been changed from MFI_fake to MFI, the MS starts using the assigned MFI_TAI and MFI_TA_TN for TA update purposes. Furthermore, in the table 145-1 or 145-2, the BSC associates the triplet {MFI, MFI_TAI, MFI_TA_TN} to the TLLI of that MS.

The MS is not allowed to send PACKET DOWNLINK ACK/NACK messages in uplink, even in case the S/P and RRBP fields are set within the MAC header of the current RLC/MAC block, until a TA value is available on the MS side via the continuous TA update procedure.

Therefore, the MSs having been assigned an individual triplet {MFI, MFI_TAI, MFI_TA_TN} perform the continuous TA update procedure and, whenever required, send PACKET DOWNLINK ACK/NACK messages for the retransmissions management. The MSs counted by the BSC with the MFI_fake do not perform the continuous TA update procedure, and do not send PACKET DOWNLINK ACK/NACK messages, but anyway take advantage of the retransmissions performed by the BSC on the basis of the PACKET DOWNLINK ACK/NACK messages sent by the MSs included in the list of the individually addressable MSs. The MSs of which the BSC is not aware of (i.e. the MSs which were not able to establish an uplink TBF after the reception of the MBMS ASSIGNMENT message and before the TBF starting time, and the MSs from which the BSC has not received back at least one RLC data block including the respective TLLI plus TMGI, even if they were able to establish an uplink TBF) are in the same condition as the MSs counted by the BSC with the default MFI_fake. The difference is that for the MSs of which the BSS is not aware of there are no chances to be randomly selected for inclusion in the list of the addressed MSs, unlike the MSs counted by the BSC with the MFI_fake, which can become individually addressable once one or more triplet becomes available.

Let it now be supposed that, at a given time, a MS asks for the GPRS multicast service "A", camping on a network cell (e.g., the cell CELL1) where contents related to multicast service "A" are already being distributed "over-the-air" (due to the fact that the session related to multicast service "A" is already running).

The MS, after joining the correspondent multicast group (being linked to the corresponding multicast PDP Context), is assigned by the BSC the same physical communication resources as the other mobile stations already exploiting the same multicast service "A" in that network cell and, after releasing the radio communication resources that were associated to the standard PDP Context initially activated for that MS, starts exploiting the multicast service "A". For example, an MBMS ASSIGNMENT message may be used to deliver, to such MS, the TFI and the PDCH(s) needed for tuning on the multicast service, as well as the triplet {MFI, MFI_TAI, MFI_MFI_TA_TN} needed for managing the addressing procedures.

Thanks to the invention embodiments described in the foregoing, GPRS service data can be distributed to, so as to be exploited by, a plurality of users at a same time, particularly users within the same cell of the cellular network, in a point-to-multipoint modality (i.e., in multicast), and the network resources, particularly the physical radio resources, to be allocated are not directly dependent on the number of users simultaneously exploiting the GPRS services. This is of great benefit especially in case of GPRS services relatively heavy from the viewpoint of the quantity of data to be transferred, such as in GPRS services involving the distribution of multimedia (audio and/or video) contents. Additionally, the possibility offered by the provision of the additional MS identifier, the MFI, of individually addressing the MSs even if, belonging to a same multicast service group, they share the same TFI, is extremely useful, allowing for example to implement highly efficient acknowledge/unacknowledge policies and thus improving the network quality of service level.

It is also pointed out that more than one GPRS services can be distributed in multicast at a same time: in this case, two or more TFIs will be broadcasted over the cell broadcast channel, each one labeling radio data blocks of a respective TBF, corresponding to a respective pilot PDP context; also in this case, the possibility of individually addressing the MSs remains.

The solution according to the embodiment of the invention herein described has the significant advantage of not necessitating massive modifications of the standard GSM/GPRS apparatuses, already deployed on field.

Although the present invention has been disclosed and described by way of an embodiment, it is apparent to those skilled in the art that several modifications to the described embodiment as well as other embodiments of the present invention are possible without departing from the scope thereof as defined in the appended claims.

The invention claimed is:

1. In a wireless communications network comprising a base station subsystem configured to control at least one network cell and in which the base station subsystem is configured to communicate with mobile stations in the cell through radio blocks, a method of distributing information contents received in data packets at the base station subsystem to the mobile stations, comprising:
   obtaining, from the data packets, radio blocks to be transmitted through the network cell;
   labeling said radio blocks with a first radio link identifier for identifying a logic connection between a mobile station and the base station subsystem, the first radio link identifier associated with a multicast service;
   communicating the first radio link identifier to a first mobile station in the network cell; and
   communicating the first radio link identifier to at least one second mobile station in the network cell if the at least one second mobile station requests the information contents, wherein each of the first mobile station and the at least one second mobile station is assigned a unique second radio link identifier to be included in said radio blocks, wherein each of the second radio link identifiers is indicative of a subscription of the first mobile station and the at least one second mobile station to the multicast service corresponding to the first radio link identifier.

2. The method according to claim 1, wherein said first radio link identifier comprises a temporary flow identity corresponding to a temporary block flow activated by the base station subsystem for delivering the information contents to the mobile stations.

3. The method according to claim 1, wherein said second radio link identifiers are univocally assigned to each mobile station.

4. The method according to claim 1, wherein said step of having the first and the at least one second mobile stations assigned respective second radio link identifiers comprises assigning to the first and the at least one second mobile stations parameters useful for enabling a synchronization of the radio communication between the mobile station and the base station subsystem.

5. The method according to claim 1, wherein said step of having the first and the at least one second mobile stations assigned respective second radio link identifiers is performed by the base station subsystem on request by the mobile stations.

6. The method according to claim 1, wherein said step of having the first and the at least one second mobile stations assigned respective second radio link identifiers is performed by the base station subsystem automatically in reply to a service request from the mobile stations.

7. The method according to claim 5, wherein said step of having the first and the at least one second mobile stations assigned respective second radio link identifiers is performed before starting to transmit the radio blocks.

8. The method according to claim 5, wherein said step of having the first and the at least one second mobile stations assigned respective second radio link identifiers is performed after said step of communicating said first radio link identifier to said first and said second mobile stations.

9. The method according to claim 6, wherein said step of having the first and the at least one second mobile stations assigned respective second radio link identifiers is performed before said step of communicating said first radio link identifier to said first and said second mobile stations.

10. The method according to claim 1, wherein said step of having the first and the at least one second mobile stations assigned respective second radio link identifiers comprises having every mobile station in excess of a predetermined number assigned a common second radio link identifier.

11. The method according to claim 1, wherein said step of having the first and the at least one second mobile stations assigned respective second radio link identifiers comprises establishing a temporary communication uplink from the mobile stations to the base station subsystem.

12. The method according to claim 11, further comprising releasing the temporary communication uplink before transmitting through the network cell said radio blocks obtained from said data packets.

13. The method according to claim 1, further comprising addressing information to a selected mobile station among the first and the at least one second mobile stations using the respective second radio link identifier.

14. The method according to claim 13, wherein said step of addressing information comprises including the second radio link identifier in at least one radio block obtained from said data packets.

15. The method according to claim 14, wherein said second radio link identifier is included in a header portion of the at least one radio block.

16. The method according to claim 13, wherein said step of addressing information further comprises requesting the selected mobile station to provide an answer.

17. The method according to claim 16, wherein said step of requesting the selected mobile station to provide an answer comprises requesting the mobile station to provide acknowledge information on the successful receipt of the radio blocks obtained from the data packets.

18. The method according to claim 17, comprising retransmitting already transmitted radio blocks, obtained from the data packets, depending on the acknowledge information received from the mobile stations.

19. The method according to claim 17, comprising having said answer transmitted to the base station subsystem on a control channel associated with a channel on which the radio blocks are transmitted.

20. A wireless communications network system, comprising:
  a network base station subsystem configured for wireless communication with a plurality of mobile stations located in a network cell via radio blocks, the base station subsystem being configured to:
  receive data packets, the data packets including information contents to be distributed to one or more of the plurality of mobile stations;
  obtain radio blocks from the data packets;
  label the radio blocks with a first radio link identifier;
  communicate the first radio link identifier to a first mobile machine in the network cell, the first radio link identifier associated with a multicast service;
  transmit the radio blocks associated with the first radio link identifier; and
  communicate the first radio link identifier to at least one second mobile station in the network cell if the at least one second mobile station requests the information contents, wherein each of the first mobile station and the at least on second mobile station is assigned a unique second radio link identifier to be included in said radio blocks, wherein each of the second radio link identifiers is indicative of a subscription of the first mobile station and the at least one second mobile station to the multicast service corresponding to the first radio link identifier.

21. The wireless communications network system according to claim 20, wherein said first radio link identifier comprises a temporary flow identity corresponding to a temporary block flow activated by the base station subsystem for delivering the information contents to the mobile stations.

22. The wireless communications network system according to claim 20, wherein the base station subsystem is configured to univocally assign said second radio link identifiers to each mobile station.

23. The wireless communications network system according to claim 20, wherein the base station subsystem is further configured to assign, to the first mobile station and the at least one second mobile station, parameters for enabling a synchronization of the radio communications between the mobile stations and the base station subsystem.

24. The wireless communications network system according to claim 20, wherein the base station subsystem is adapted to assign the second radio link identifiers on request from the mobile stations.

25. The wireless communications network system according to claim 20, wherein the base station subsystem is configured to assign the second radio link identifiers automatically in reply to a service request from the mobile stations.

26. The wireless communications network system according to claim 24, wherein the base station subsystem is configured to assign the second radio link identifiers before starting to transmit the radio blocks obtained from the data packets.

27. The wireless communications network system according to claim 24, wherein the base station subsystem is configured to assign the second radio link identifiers after communicating the first radio link identifier to the mobile stations.

28. The wireless communications network system according to claim 25, wherein the base station subsystem is configured to assign the second radio link identifiers before communicating the first radio link identifier.

29. The wireless communications network system according to claim 20, wherein the base station subsystem is configured to assign a common second radio link identifier to every mobile station in excess of a predetermined number.

30. The wireless communications network system according to claim 20, wherein the base station subsystem is configured to establish a temporary communication uplink from the mobile stations to the base station subsystem before starting to transmit the radio blocks obtained from the data packets.

31. The wireless communications network system according to claim 20, wherein the base station subsystem is configured to address information to a mobile station among the first mobile station and the at least one second mobile stations using the respective second radio link identifiers.

32. The wireless communications network system according to claim 31, wherein the second radio link identifier is included in at least one of the radio blocks obtained from the data packets.

33. The wireless communications network system according to claim 32, wherein the base station subsystem is configured to request the addressed mobile station to provide an answer.

34. The wireless communications network system according to claim 33, wherein the base station subsystem is adapted to request the addressed mobile station to provide acknowledgement information on the successful receipt of the radio blocks obtained from the data packets.

35. The wireless communications network system according to claim 34, wherein the base station subsystem is configured to retransmit previously transmitted radio blocks obtained from said data packets, based on the acknowledge information received from the mobile stations.

36. The wireless communications network system according to claim 33, wherein said answer is transmitted on a control channel associated with a channel on which the radio blocks are transmitted.

* * * * *